United States Patent
Smith et al.

(10) Patent No.: US 11,460,132 B2
(45) Date of Patent: Oct. 4, 2022

(54) LOCATOR SYSTEMS AND METHODS FOR HOSE CLAMPS

(71) Applicant: Ideal Clamp Products, Inc., Smyrna, TN (US)

(72) Inventors: Joshua B. Smith, Manchester, TN (US); Marc D. Bullard, Albany, NY (US); Watkins Crockett, Franklin, TN (US); Richard Baehr, Smyrna, TN (US)

(73) Assignee: Ideal Clamp Products, Inc., Smyrna, TN (US)

( * ) Notice: Subject to any disclaimer, the term of this patent is extended or adjusted under 35 U.S.C. 154(b) by 0 days.

(21) Appl. No.: 17/441,760

(22) PCT Filed: Mar. 25, 2020

(86) PCT No.: PCT/US2020/024677
§ 371 (c)(1),
(2) Date: Sep. 22, 2021

(87) PCT Pub. No.: WO2020/198339
PCT Pub. Date: Oct. 1, 2020

(65) Prior Publication Data
US 2022/0178476 A1    Jun. 9, 2022

Related U.S. Application Data

(60) Provisional application No. 62/823,639, filed on Mar. 25, 2019.

(51) Int. Cl.
*F16L 33/02*   (2006.01)
*F16L 3/137*   (2006.01)
*F16L 3/13*    (2006.01)

(52) U.S. Cl.
CPC ............. *F16L 33/021* (2013.01); *F16L 3/137* (2013.01)

(58) Field of Classification Search
CPC ......... F16L 33/021; F16L 3/137; F16L 33/08; Y10T 24/1427; Y10T 24/1486
See application file for complete search history.

(56) References Cited

U.S. PATENT DOCUMENTS 3,389,442 A * 6/1968 Tetzlaff ................... F16L 33/10
                                                                 285/252
3,407,448 A * 10/1968 Tetzlaff ................... F16L 33/10
                                                                 24/19

(Continued)

FOREIGN PATENT DOCUMENTS

WO    2017/202609 A1   11/2017
WO    2018/210538 A1   11/2018

OTHER PUBLICATIONS

USPTO, International Search Report for PCT/US2020/024677, dated Jun. 19, 2020, 3 pages.

(Continued)

*Primary Examiner* — David M Upchurch
(74) *Attorney, Agent, or Firm* — Barnes & Thornburg LLP

(57) ABSTRACT

Locator systems and methods for hose clamps include at least one a locator tab. Each locator tab includes a main body, a clamp end, and at least one flange. The main body includes a crossbar having opposing first and second ends, a first leg extending from the first end, and a second leg extending from the second end. The clamp end extends from the main body and is configured to be secured to a hose. The at least one flange extends from the main body and is configured to retain a band of the hose clamp between the at least one flange and the crossbar until the band is tightened (Continued)

around the hose. The crossbar is non-parallel to the band when the band is retained between the at least one flange and the crossbar.

20 Claims, 26 Drawing Sheets

(56) References Cited

U.S. PATENT DOCUMENTS

| | | | | |
|---|---|---|---|---|
| 3,477,106 | A * | 11/1969 | Tetzlaff | F16L 33/04 |
| | | | | 285/253 |
| 7,761,962 | B2 * | 7/2010 | Krauss | F16L 33/08 |
| | | | | 24/19 |
| 7,896,400 | B2 | 3/2011 | Brill et al. | |
| 10,962,156 | B2 | 3/2021 | Leusner et al. | |
| 11,215,302 | B2 * | 1/2022 | Breideband | F16L 33/03 |
| 2004/0207195 | A1 * | 10/2004 | Bowater | F16L 33/08 |
| | | | | 285/23 |
| 2009/0019673 | A1 | 1/2009 | Rigollet et al. | |
| 2009/0189389 | A1 | 7/2009 | Brill et al. | |
| 2010/0058563 | A1 * | 3/2010 | Col | F16L 33/08 |
| | | | | 285/253 |
| 2017/0184236 | A1 | 6/2017 | Bowater et al. | |
| 2017/0184237 | A1 * | 6/2017 | Bowater | F16L 33/08 |
| 2019/0293216 | A1 * | 9/2019 | Leusner | F16L 33/08 |
| 2020/0166165 | A1 * | 5/2020 | Kim | F16L 33/08 |
| 2020/0173587 | A1 | 6/2020 | Breideband et al. | |

OTHER PUBLICATIONS

USPTO, Written Opinion of the International Searching Authority for PCT/US2020/024677, dated Jun. 19, 2020, 6 pages.

WIPO, International Preliminary Report on Patentability for PCT/US2020/024677, dated Sep. 28, 2021, 7 pages.

* cited by examiner

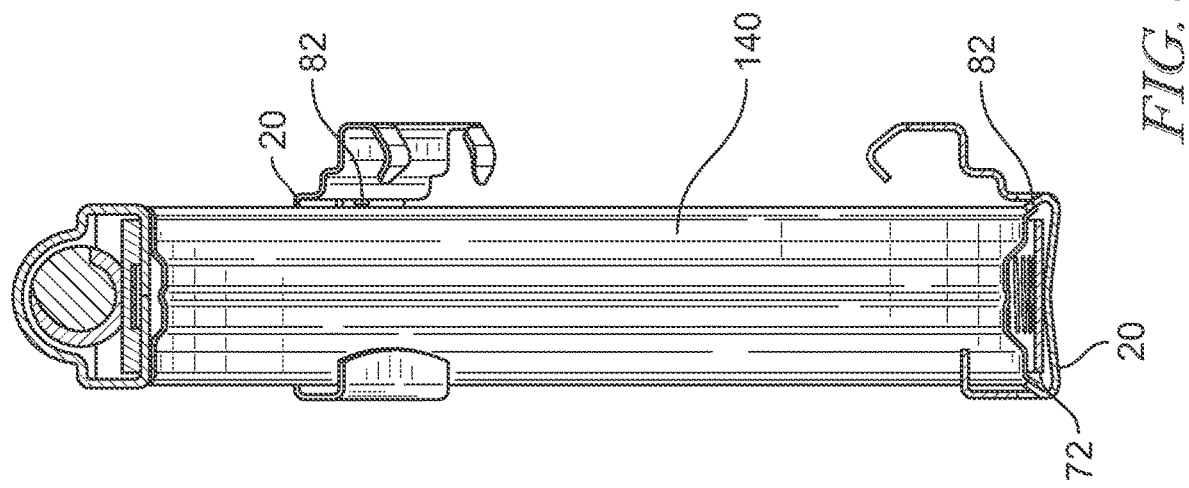
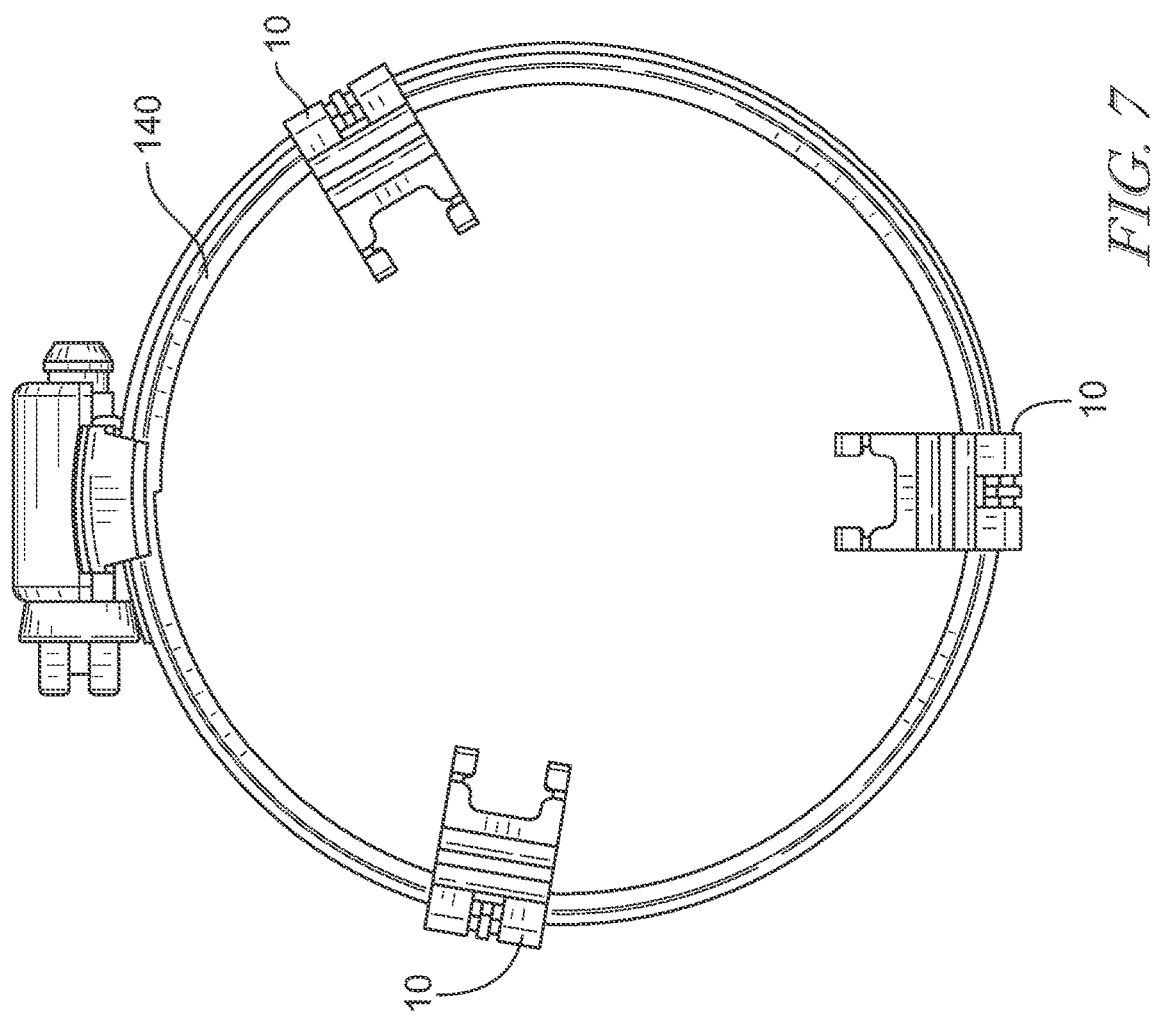

LOCATOR SYSTEMS AND METHODS FOR HOSE CLAMPS

CROSS-REFERENCE TO RELATED APPLICATION

This application is a national stage entry under 35 U.S.C. § 371 of PCT International Application No. PCT/US2020/024677, filed Mar. 25, 2020, which claims the benefit of U.S. Provisional Patent Application No. 62/823,639, filed Mar. 25, 2019, the entire disclosures of which are incorporated herein by reference.

TECHNICAL FIELD

The present disclosure relates, generally, to hose clamps and, more particularly, to locator systems and methods for hose clamps.

BACKGROUND

Generally, a hose is clamped to a pipe to secure the hose to the pipe. During assembly, the clamp may be positioned over an end of the hose prior to coupling the hose to the pipe. The clamp and hose end may then be positioned over the pipe, and the clamp may be tightened (e.g., run-down) to secure the hose to the pipe. This assembly can be time consuming since it requires the additional step of positioning the clamp on the hose end. To expedite the assembly, some hoses are provided to end users with a clamp pre-fit on the hose end. Accordingly, there is a need to locate and retain the clamp on the hose end (e.g., during shipping of the hose/clamp assembly to an end user).

SUMMARY

According to one aspect of the present disclosure, a locator tab for a hose clamp may include a main body having a crossbar having opposing first and second ends, a first leg extending from the first end, and a second leg extending from the second end. A clamp end may extend from the main body and configured to be secured to a hose. At least one flange may extend from the main body and may be configured to retain a band of the hose clamp between the at least one flange and the crossbar until the band is tightened around the hose. The crossbar may be non-parallel to the band when the band is retained between the at least one flange and the crossbar.

In some embodiments, the crossbar may include a first segment and a second segment coupled to the first segment by a center beam. The center beam may include a detent configured to engage a recess formed in the band of the hose clamp when the band is retained between the at least one flange and the crossbar. The first segment may extend at a non-orthogonal angle from the first leg. The second segment may extend at a non-orthogonal angle from the second leg. The crossbar may include a first angled segment extending from the first leg and a second angled segment extending from the second leg. The first angled segment may be angled at a first degree relative to the first leg. The second angled segment may be angled at a second degree relative to the second leg. The first degree may be the same as the second degree. The crossbar, the first leg, and the second leg may collectively form an M-shape.

In some embodiments, the crossbar may include a detent configured to engage a recess formed in the band of the hose clamp when the band is retained between the at least one flange and the crossbar. The at least one flange may include a pair of flanges extending from the main body. The pair of flanges may include a first flange formed in the first leg and a second flange formed in the second leg. The first leg may include an arm configured to abut an outer surface of the hose. The clamp end may extend from the second leg. The clamp end may include at least one tooth configured to engage an inner surface of the hose. The at least one tooth may be configured to be flush with the inner surface of the hose when the at least one tooth is engaged with the inner surface.

In some embodiments, the second leg may include a flare to provide clearance for the band as the band is tightened around the hose. The first leg may also include a flare to provide clearance for the band as the band is tightened around the hose. The at least one flange may be configured to engage a liner of the hose clamp to retain the band between the at least one flange and the crossbar until the band is tightened around the hose.

According to another aspect of the present disclosure, a locator tab for a hose clamp may include a crossbar comprising a center beam, a first segment angled relative to the center beam, and a second segment angled relative to the center beam. A first leg may extend from the first segment of the crossbar. A second leg may extend from the second segment of the crossbar. A clamp end may extend from one of the first and second legs. The clamp end may be configured to secure the locator tab to a hose. A first flange may extend from first leg. The first flange may be configured to retain a band of the hose clamp between the first flange and the first segment of the crossbar until the band is tightened around the hose.

In some embodiments, a second flange may extend from second leg. The second flange may be configured to retain the band of the hose clamp between the second flange and the second segment of the crossbar until the band is tightened around the hose. The center beam may include a detent configured to engage a recess formed in the band of the hose clamp when the band is retained between the first and second flanges and the crossbar. The first segment may extend at a non-orthogonal angle from the first leg. The second segment may extend at a non-orthogonal angle from the second leg. The first leg may include an arm configured to abut an outer surface of the hose. The clamp end may extend from the second leg and includes at least one tooth configured to engage an inner surface of the hose. The at least one tooth may be configured to be flush with the inner surface of the hose when the at least one tooth is engaged with the inner surface.

In some embodiment, the second leg may include a flare to provide clearance for the band as the band is tightened around the hose. The first leg may also include a flare to provide clearance for the band as the band is tightened around the hose. The first and/or second flanges may be configured to engage a liner of the hose clamp to retain the band between the first and/or second flanges and the crossbar until the band is tightened around the hose. The crossbar, the first leg, and the second leg may collectively form an M-shape.

According to yet another aspect of the present disclosure, a method may include positioning a band of a hose clamp between first and second legs of a locator tab. The method may also include engaging at least one flange to retain the band of the hose clamp between the at least one flange and a crossbar extending between the first and second legs of the locator tab. The crossbar may extend non-parallel to the band.

In some embodiments, the method may also include positioning the first and second legs of the locator tab against a hose. The method may also include securing a clamp end extending from the second leg of the locator tab to an end of the hose. Securing the clamp end to the end of the hose may comprise engaging at least one tooth of the clamp end with an inner surface of the hose. Engaging at least one tooth of the clamp end with the inner surface of the hose may comprise engaging the at least one tooth of the clamp end with the inner surface of the hose such that the at least one tooth is flush with the inner surface of the hose.

The method may also include tightening the band of the hose clamp around the hose to disengage the hose clamp from the at least one flange of the locator tab. Engaging at least one flange to retain the band of the hose clamp may comprise engaging a first flange extending from the first leg of the locator tab and engaging a second flange extending from the second leg of the locator tab, such that the band is retained between the first and second flanges and the crossbar. Engaging at least one flange to retain the band of the hose clamp may comprise contacting a liner of the hose clamp with the at least one flange to retain the band between the at least one flange and the crossbar. The method may also include positioning a detent of the crossbar in a recess formed in the band of the hose clamp.

BRIEF DESCRIPTION OF THE DRAWINGS

The concepts described in the present disclosure are illustrated by way of example and not by way of limitation in the accompanying drawings. Where considered appropriate, reference labels have been repeated among the drawings to indicate corresponding or analogous elements. The detailed description particularly refers to the accompanying figures in which:

FIG. 7 is a top plan view of a hose clamp having a plurality of locator tabs positioned at various circumferential locations of the hose clamp;

FIG. 8 is a side cross-sectional view of the hose clamp shown in FIG. 7;

DETAILED DESCRIPTION OF THE DRAWINGS

Figure 1:
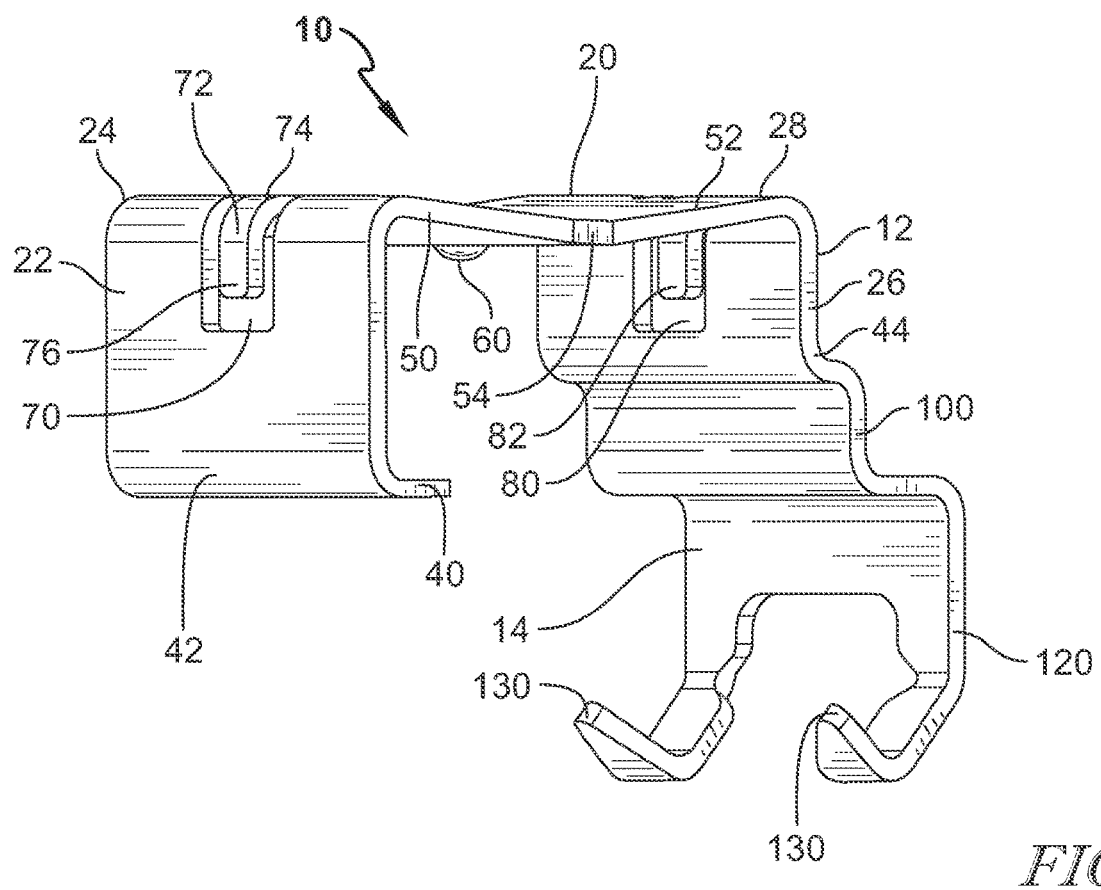
FIG. 1 is a perspective view of a locator tab for a hose clamp formed in accordance with one embodiment and in an open configuration.

While the concepts of the present disclosure are susceptible to various modifications and alternative forms, specific embodiments thereof have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 2:
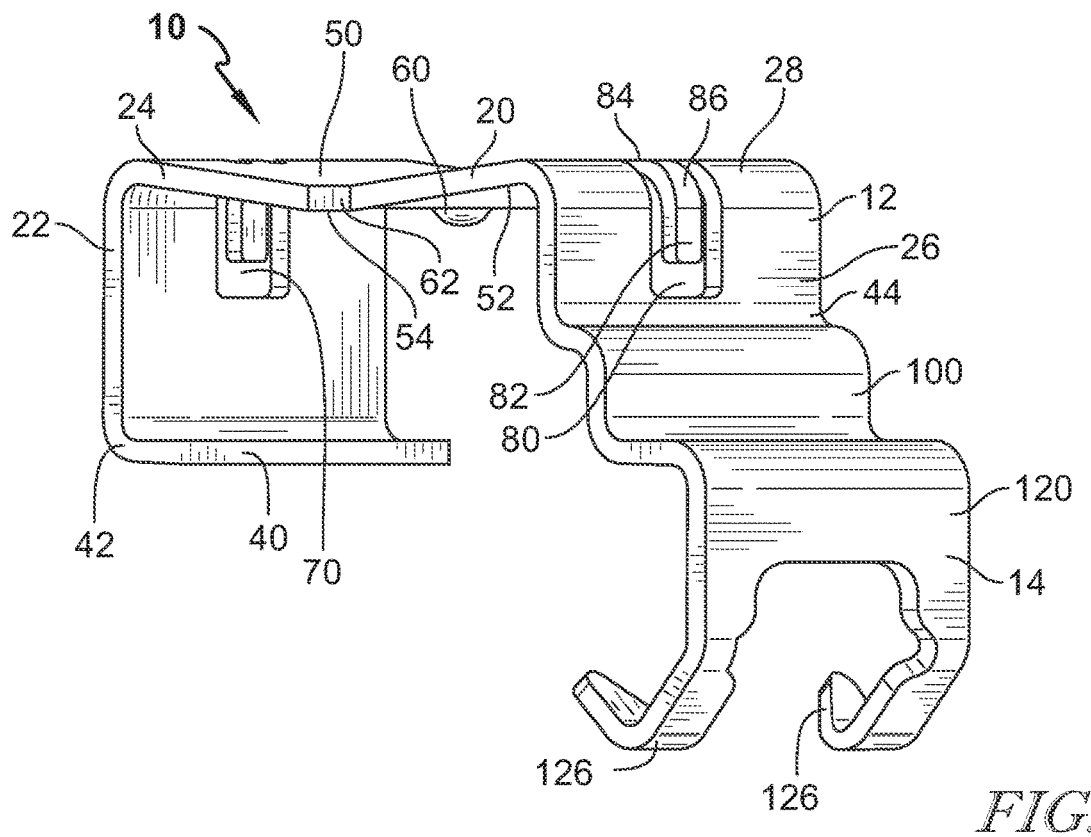
FIG. 2 is another perspective view of the locator tab shown in FIG. 1.
Figure 3:
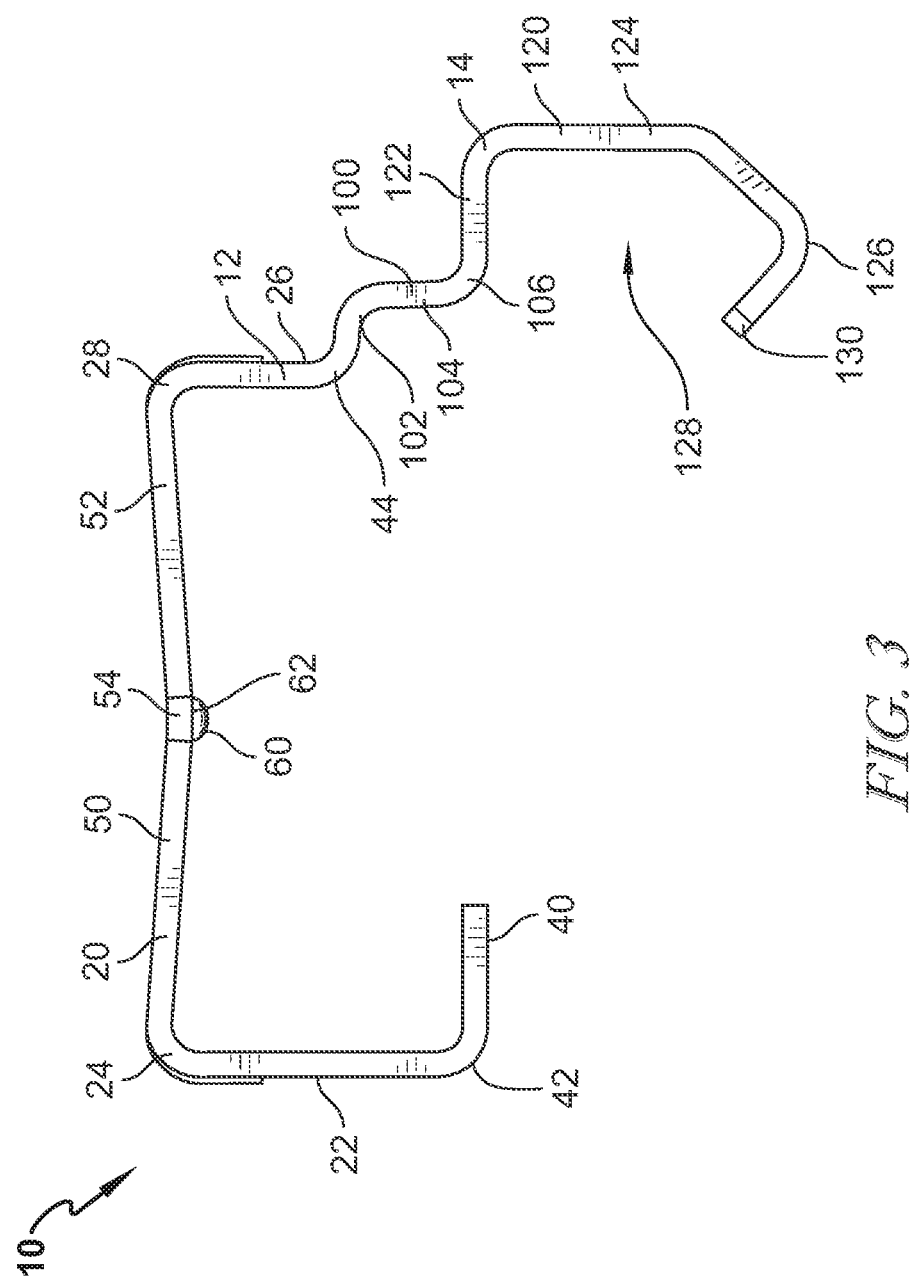
FIG. 3 is a side view of the locator tab shown in FIG. 1.

Referring to FIGS. 1-3, a locator tab 10 includes a main body 12 and a clamp end 14 extending from the main body 12. The main body 12 includes a top crossbar 20, a leg 22 extending from an end 24 of the crossbar 20, and a leg 26 extending from an opposite end 28 of the crossbar 20. A foot 40 extends from an end 42 of the leg 22. The clamp end 14 extends from an end 44 of the leg 26.

The crossbar 20 includes an angled segment 50 coupled to an angled segment 52 by a rounded segment 54. The rounded segment 54 is centered in the crossbar 20 and, thus, serves as a center beam of the crossbar 20. The angled segment 52 extends from the end 24 to the rounded segment 54. The angled segment 54 extends from the end 28 to the rounded segment 54. The angled segment 50, the angled segment 52, and the rounded segment 54 collectively form a crossbar 20 that is non-parallel to a band of the hose clamp (see, e.g., FIGS. 8, 16, and 18) at least when the band of the hose clamp is retained by locator tab 10. As can be seen in FIG. 3, by way of example, the crossbar 20, the angled segment 50, and the angled segment 52 collectively form an M-shape for the main body 12 of the locator tab 10.

A detent 60 extends downward from a bottom surface 62 of the rounded segment 54. The detent 60 is configured to be received in a recess (e.g., a groove, a ridge, a hole, an opening, or the like) formed in the band of the hose clamp when the band of the hose clamp is retained by locator tab 10. As such, the detent 60 retains the locator tab 10 in a predetermined circumferential position on the hose clamp (prior to tightening of the band of the hose clamp).

In some embodiments, illustrated in FIGS. 38-41, the detent 60 may be formed as a strain tab 64 that is punched through the crossbar 20. The tab 64 provides a relief window 66 through the crossbar 20 through which the hose clamp can be viewed. The tab 64 may be received in a recess formed in a band of the hose clamp to retain the locator tab 10 in a predetermined circumferential position on the hose clamp (prior to tightening of the band of the hose clamp). When the band of the hose clamp is tightened onto the hose, the recess formed in the band of the hose clamp disengages from the detent 60 (or tab 64).

The main body 12 of the locator tab 10 includes an opening 70. The opening 70 extends through a portion of the leg 22 and the angled member 50. The opening 70 is positioned at the end 24 of the crossbar 20. A flange 72 extends through the opening 70. The flange 72 includes a crossbar section 74 that extends along the angled member 50 and a leg section 76 that extends along the leg 22. The main body 12 includes another opening 80. The opening 80 extends through a portion of the leg 26 and the angled member 52. The opening 80 is positioned at the end 28 of the crossbar 20. A flange 82 extends through the opening 80. The flange 82 includes a crossbar section 84 that extends along the angled member 52 and a leg section 86 that extends along the leg 26.

Figure 4:
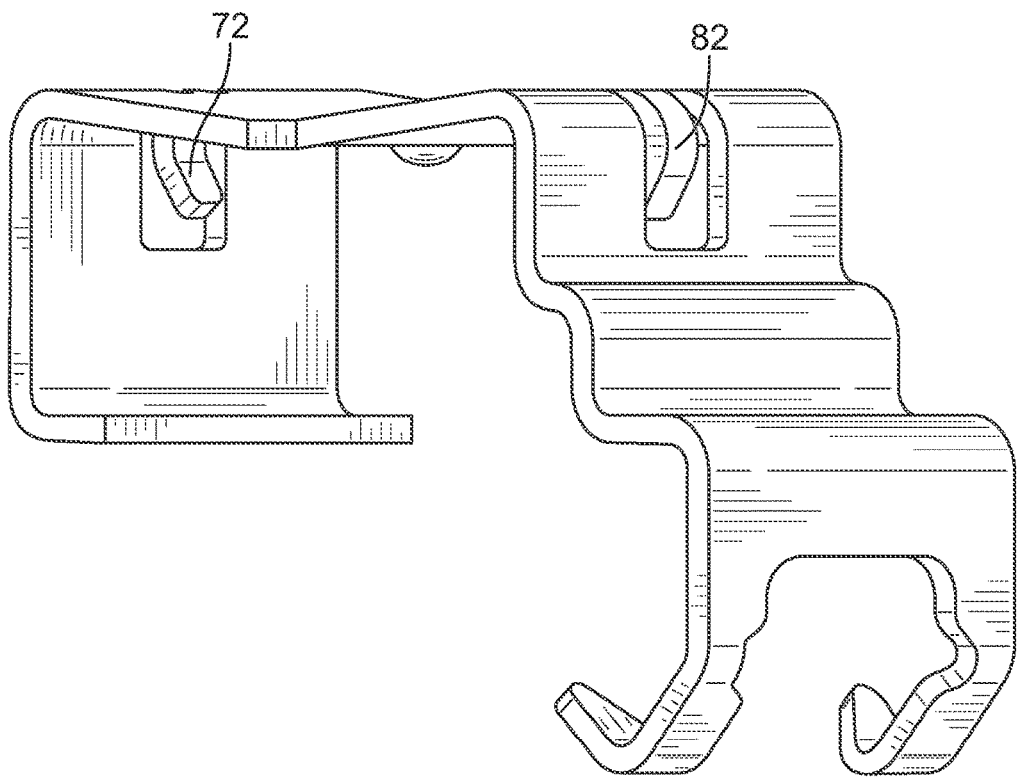
FIG. 4 is a perspective view of the locator tab of FIG. 1 in a closed configuration.
Figure 5:
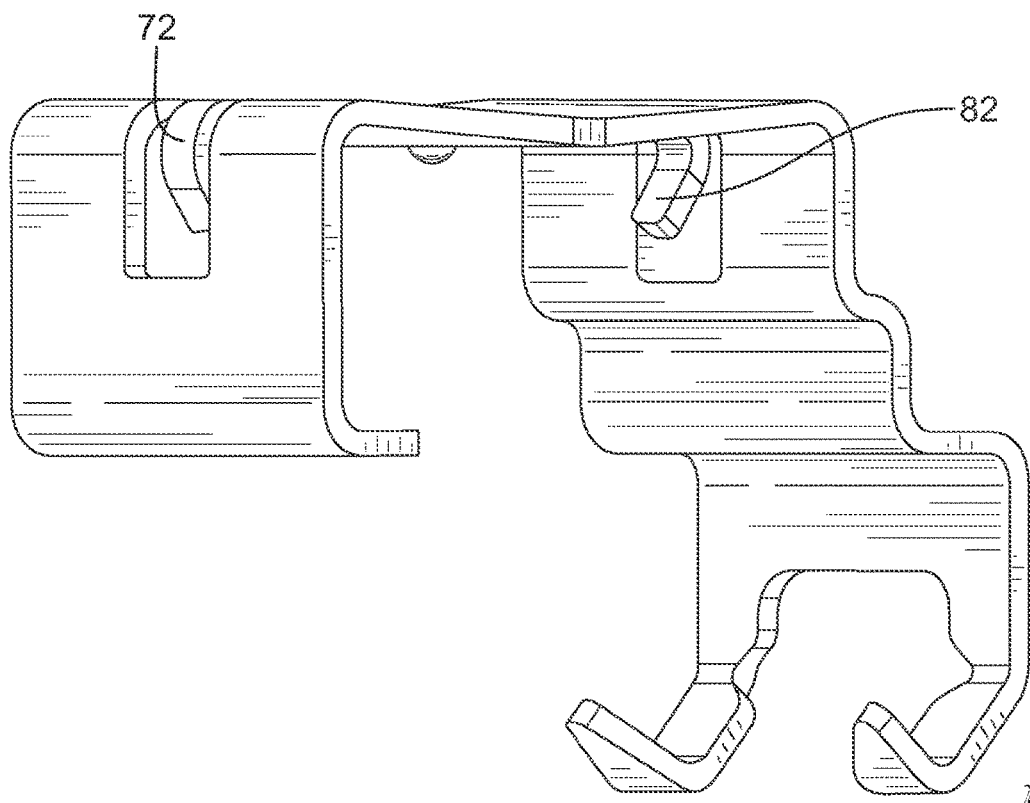
FIG. 5 is another perspective view of the locator tab shown in FIG. 4.
Figure 6:
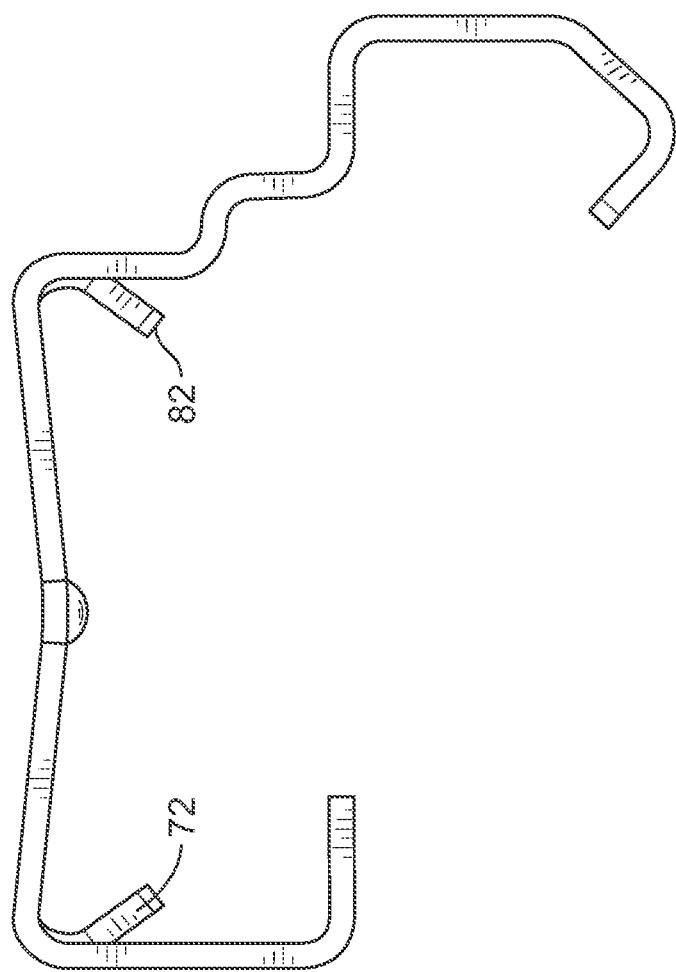
FIG. 6 is a side view of the locator tab shown in FIG. 4.

By way of example, FIG. 1-3 illustrate the flanges 72, 82 in an open configuration. In the open configuration, the locator tab 10 can be positioned on a hose clamp. The hose clamp is configured to be positioned under the crossbar 20 and between the legs 22 and 26. When the band of the hose clamp is positioned between the legs 22 and 26, the flanges 72, 82 are bent inward to a closed configuration, as illustrated in FIGS. 4-6 (by way of example). In this configuration, the band of the hose clamp is retained between the crossbar 20 and the flanges 72, 82. When the band of the hose clamp is tightened, pressure from the hose clamp flexes the flanges 72, 82 back to the open configuration so that the hose clamp can tighten around the hose (e.g., to secure the hose to pipe).

Referring back to FIGS. 1-3, the clamp end 14 includes a flare 100 having a first segment 102 extending from the end 44 of the leg 26. A second segment 104 of the flare 100 extends from the first segment 102, and a third segment 106 of the flare 100 extends from the second segment 104. The curved shape of the flare 100 (see FIG. 3 in particular) provides clearance to allow travel of a band and/or a liner of a hose clamp relative to the locator tab 10.

A hose retainer 120 extends from the flare 100. The hose retainer 120 includes an upper end 122 and a side 124 extending from the upper end 122. A pair of teeth 126 extend from the side 124. Collectively, the upper end 122, the side 124, and the teeth 126 define a cavity 128 that is configured to receive a hose end. The teeth 126 include points 130 that are configured to bite into an inner hose wall of the hose end.

That is, the teeth 126 are bent inward toward the inner hose wall to tighten the points 130 into the inner hose wall and secure the locator tab 10 to the hose. As will be appreciated by those skilled in the art, this design allows the hose retainer 120 to be secured to hoses of various sizes and wall thicknesses.

Figure 16:
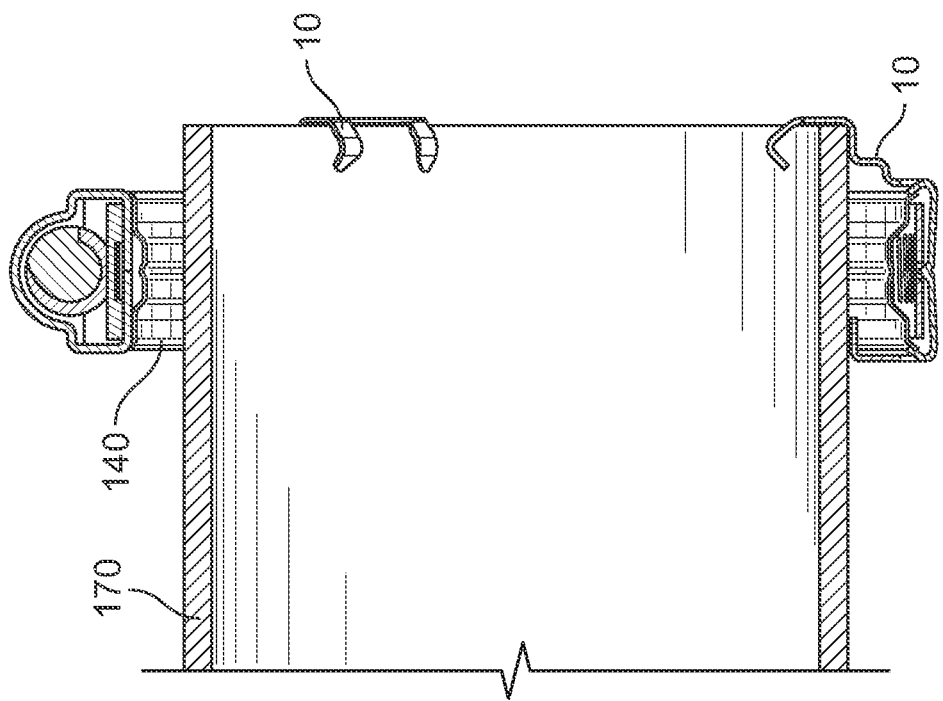
FIG. 16 is a side cross-sectional view of the configuration shown in FIG. 15.
Figure 15:
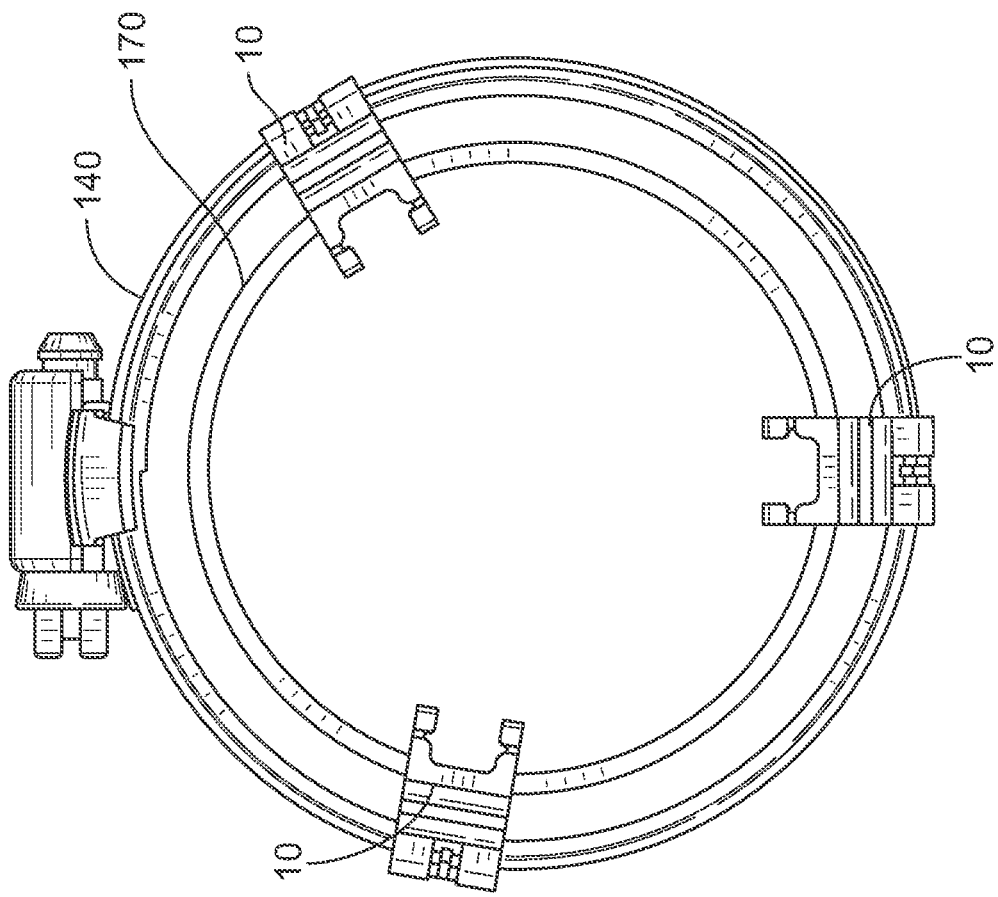
FIG. 15 is a top plan view of three locator tabs of the embodiment shown in FIGS. 1-3 positioned on a hose end in an unclamped position.
Figure 18:
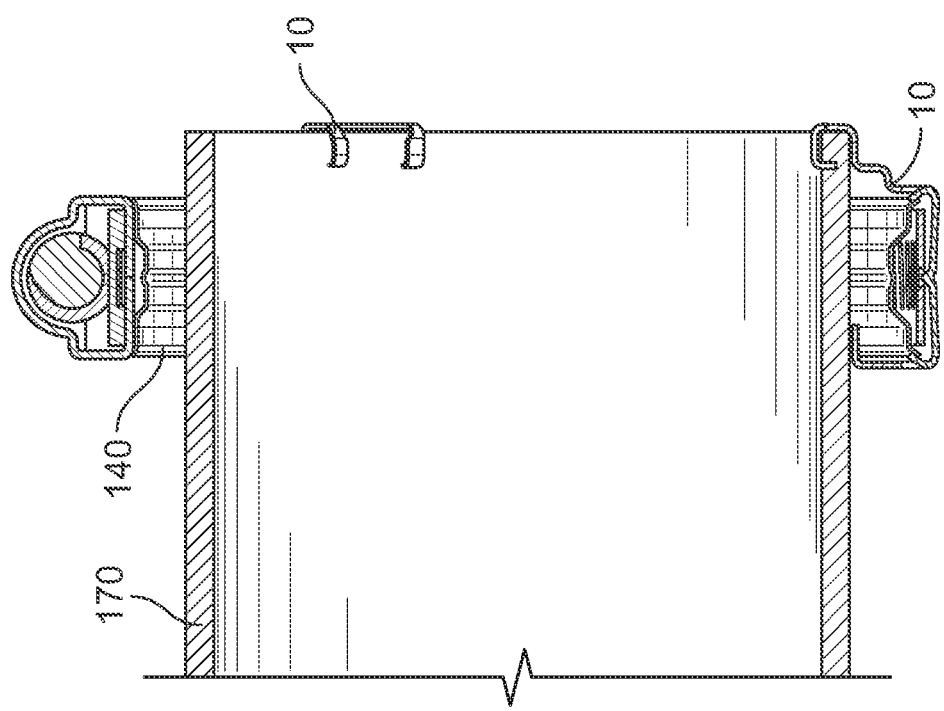
FIG. 18 is a side cross-sectional view of the configuration shown in FIG. 17.
Figure 17:
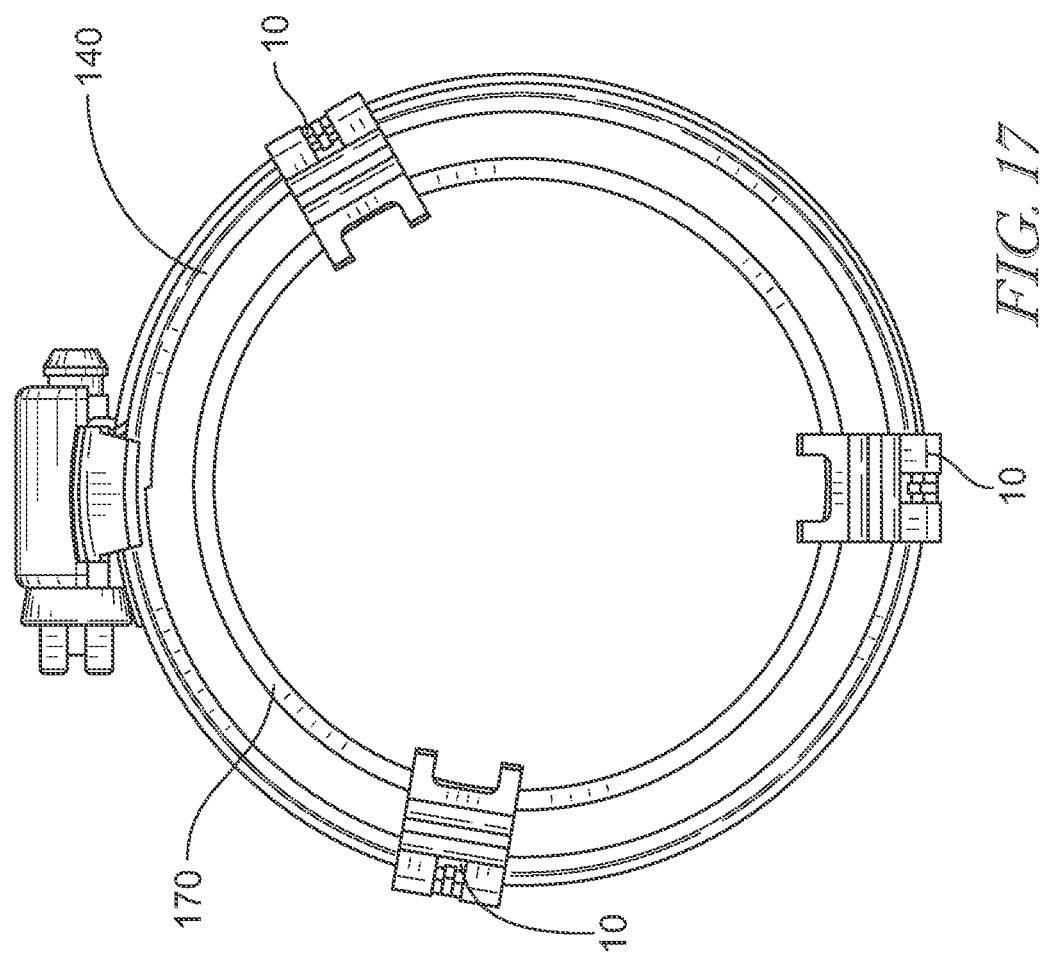
FIG. 17 is a top plan view of three locator tabs of the embodiment shown in FIGS. 1-3 positioned on a hose end in a clamped position.
Figure 20:
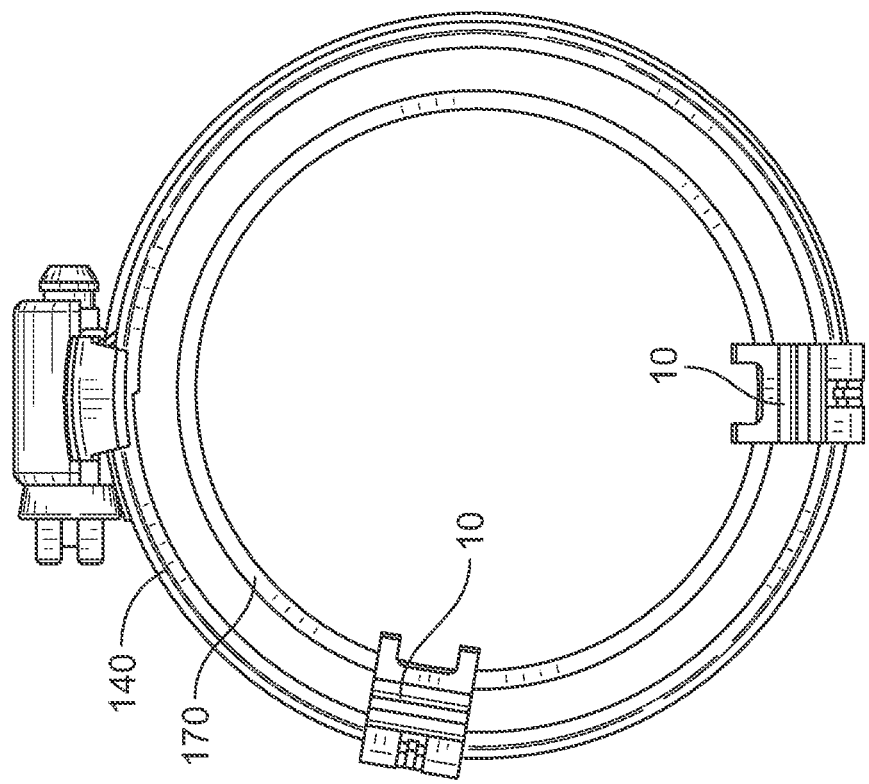
FIG. 20 is a top plan view of two locator tabs of the embodiment shown in FIGS. 1-3 positioned on a hose end in a clamped position.
Figure 19:
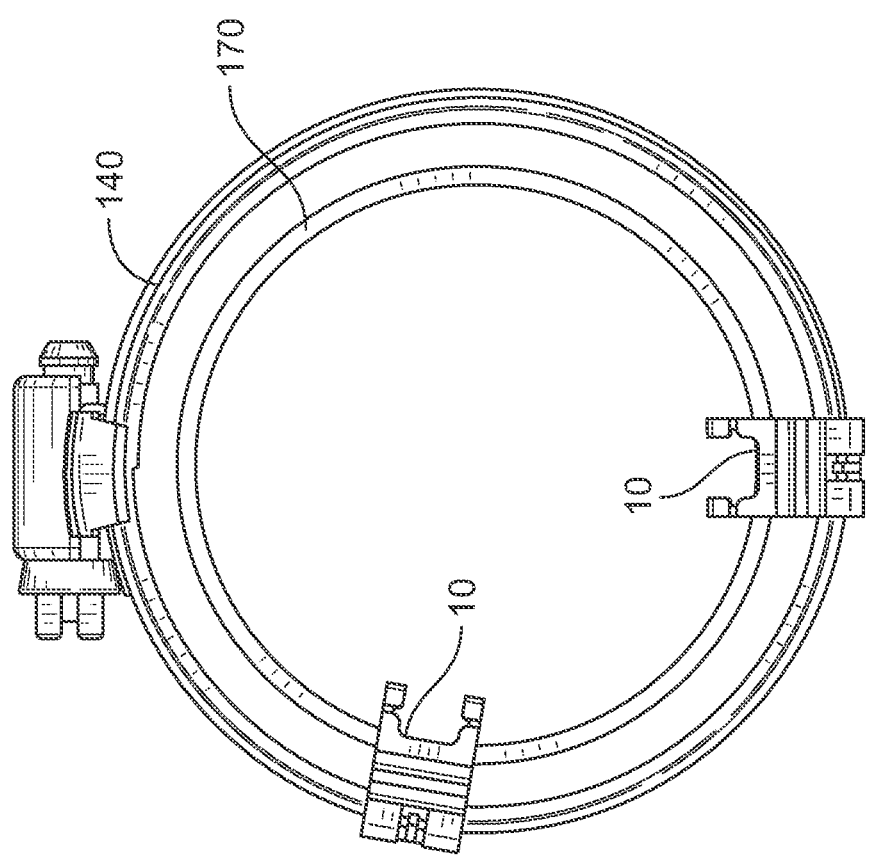
FIG. 19 is a top plan view of two locator tabs of the embodiment shown in FIGS. 1-3 positioned on a hose end in an unclamped position.

Accordingly, the locator tab 10 secures to both the hose clamp and the hose to position the hose clamp on the hose for assembly. In this configuration, the hose can be shipped to an end user with the hose clamp secured thereto. This enables the end user to save time by positioning the hose and hose clamp on a pipe at the same time. FIG. 7 illustrates three locator tabs 10 positioned on a hose clamp 140 at different circumferential positions. FIG. 8 illustrates the hose clamp 140 positioned between the crossbar 20 and the flanges 72, 82. FIGS. 15 and 16 illustrate three locator tabs 10 positioned on a hose 170 in an unclamped position. FIGS. 17 and 18 illustrate the three locator tabs 10 positioned on the hose 170 in a clamped position. In some embodiments, for example the embodiment shown in FIGS. 19 and 20, only two locator tabs 10 are utilized to position the hose clamp 140 on the hose 170.

Figure 22:
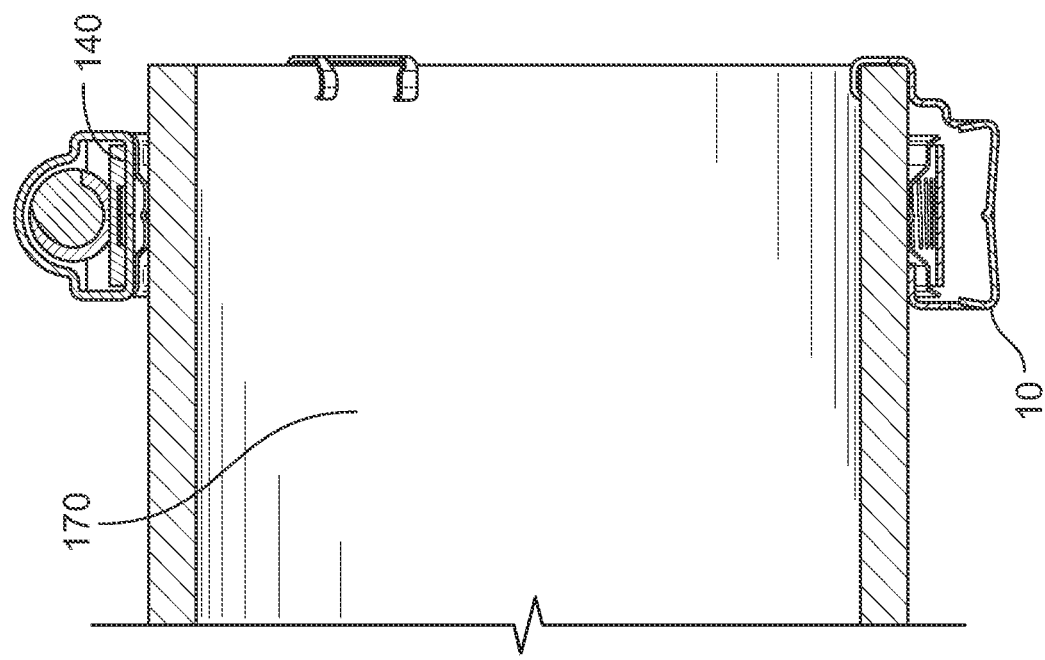
FIG. 22 is a side cross-sectional view of the configuration shown in FIG. 21.
Figure 21:
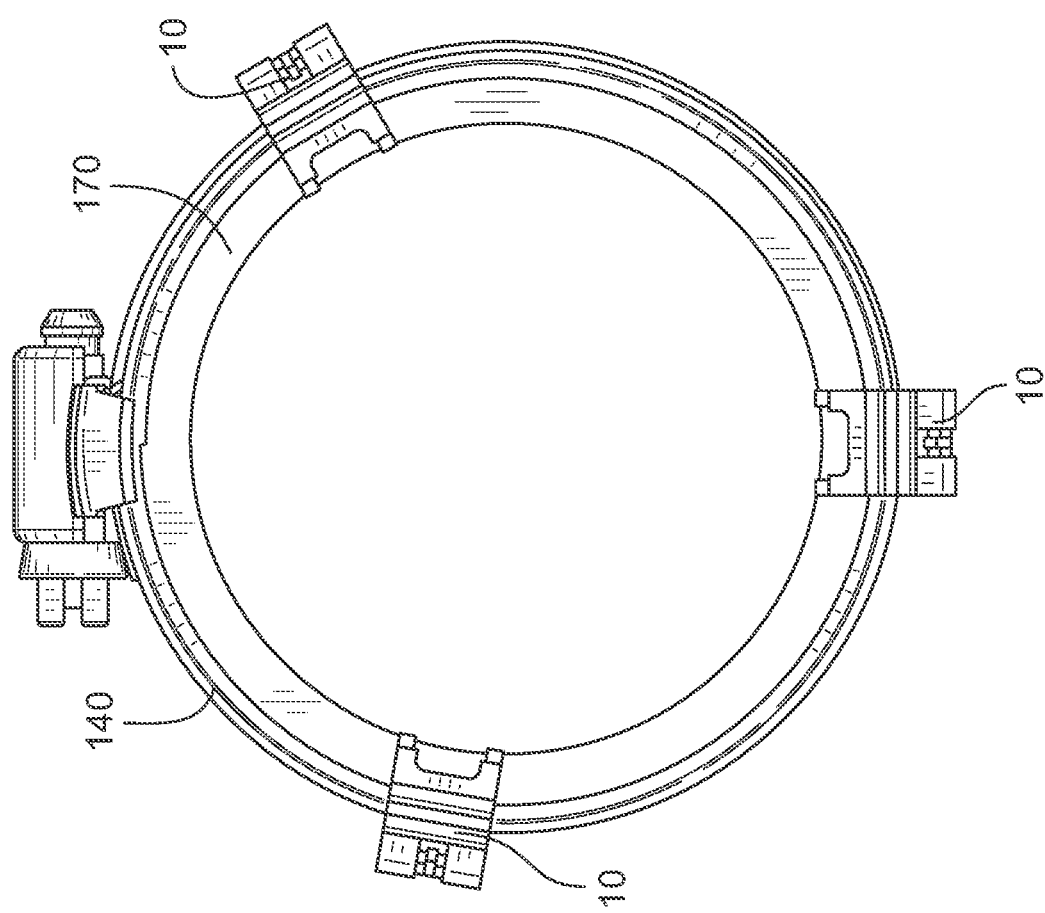
FIG. 21 is a top plan view of a hose clamp secured to a thicker hose with three locator tabs of the embodiment shown in FIGS. 1-3 (after the band of the hose clamp has been tightened)
Figure 23:
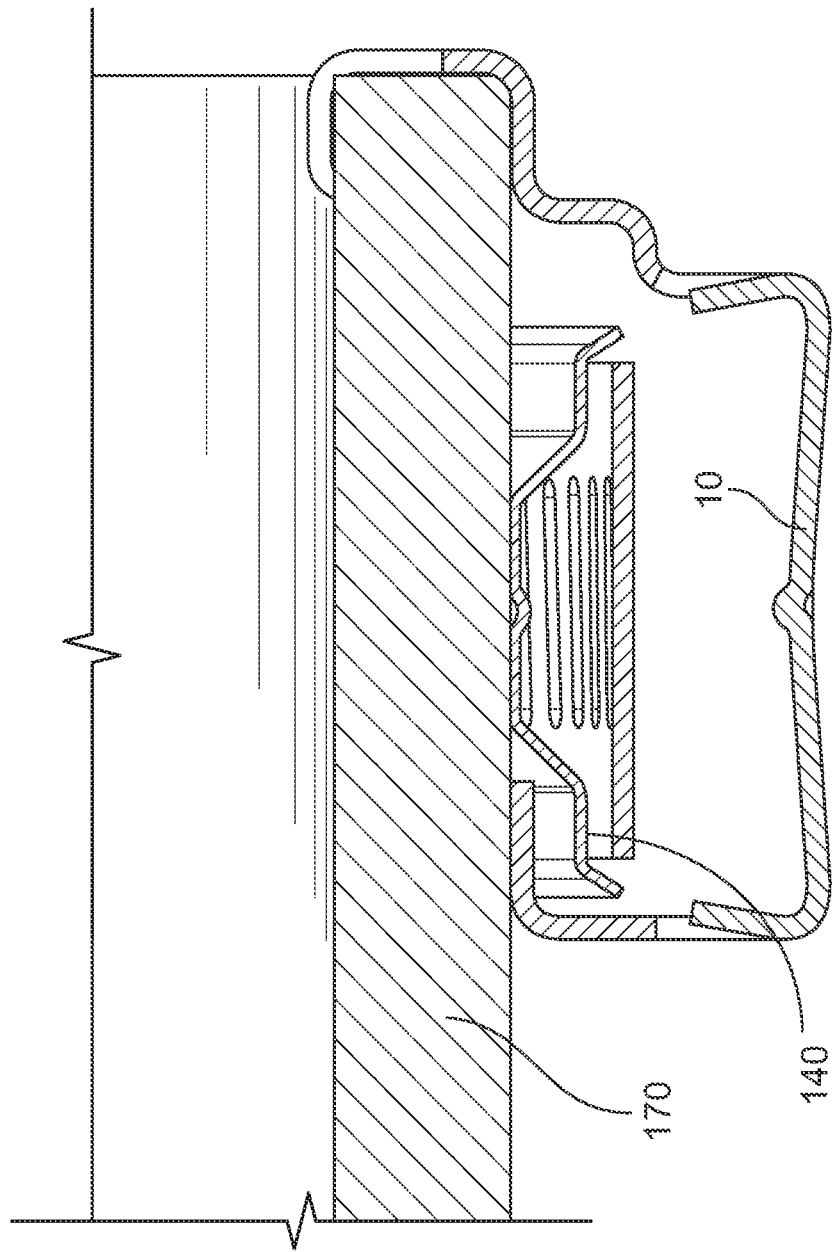
FIG. 23 is a detailed cross-sectional view of the hose clamp secured to the hose (showing detail from the bottom portion of FIG. 22)
Figure 25:
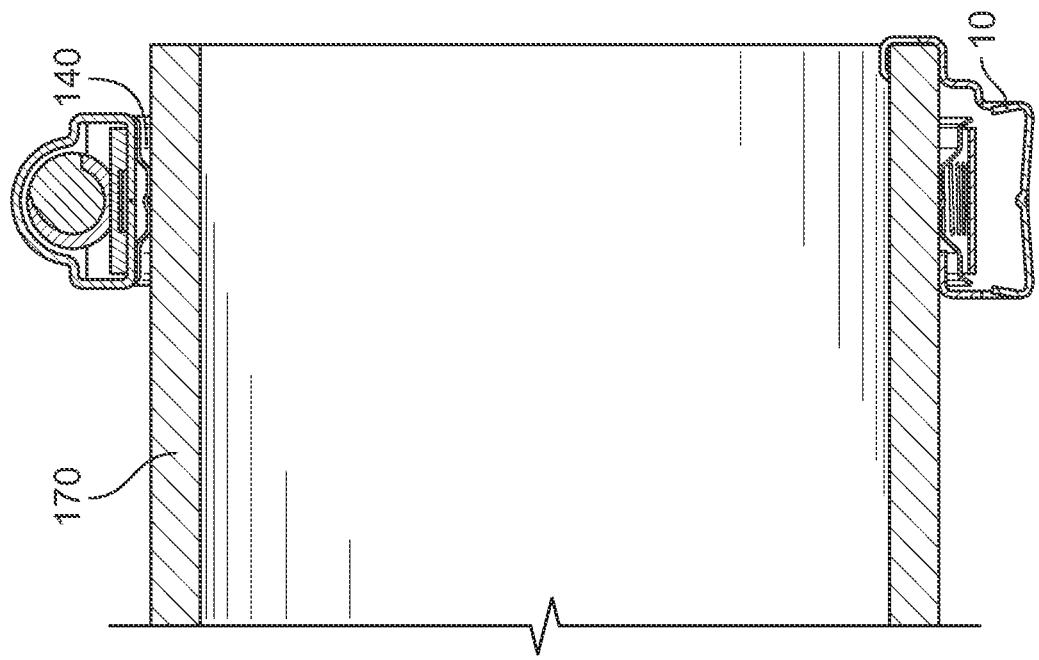
FIG. 25 is a side cross-sectional view of the configuration shown in FIG. 24.
Figure 24:
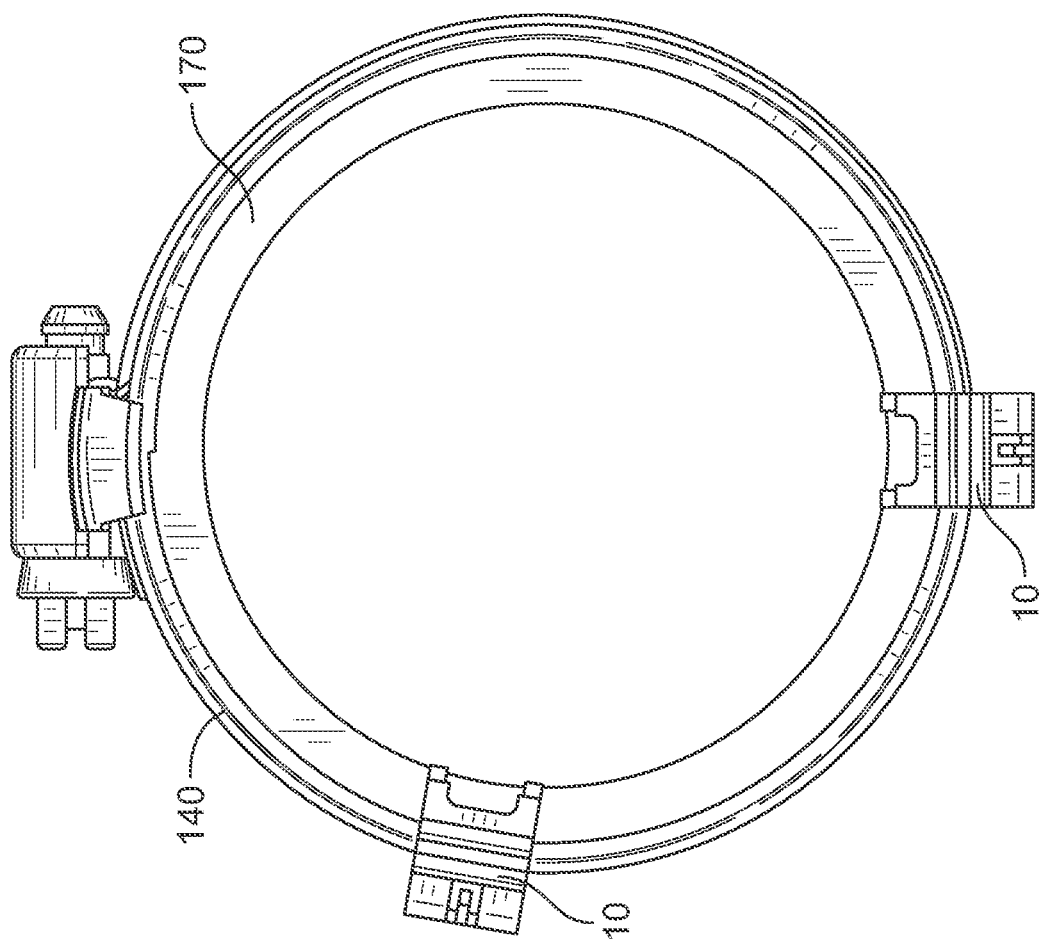
FIG. 24 is a top plan view of a hose clamp secured to a thicker hose with two locator tabs of the embodiment shown in FIGS. 1-3 (after the band of the hose clamp has been tightened)

When the hose 170 is coupled to an end of a pipe, the clamp 140 is tightened onto the hose 170 and the pipe to secure the hose to the pipe. FIGS. 21-23 illustrate a clamp 140 with three locator tabs 10 secured to the hose 170. FIGS. 24 and 25 illustrate a clamp 140 with two locator tabs 10 secured to the hose 170.

Figure 9:
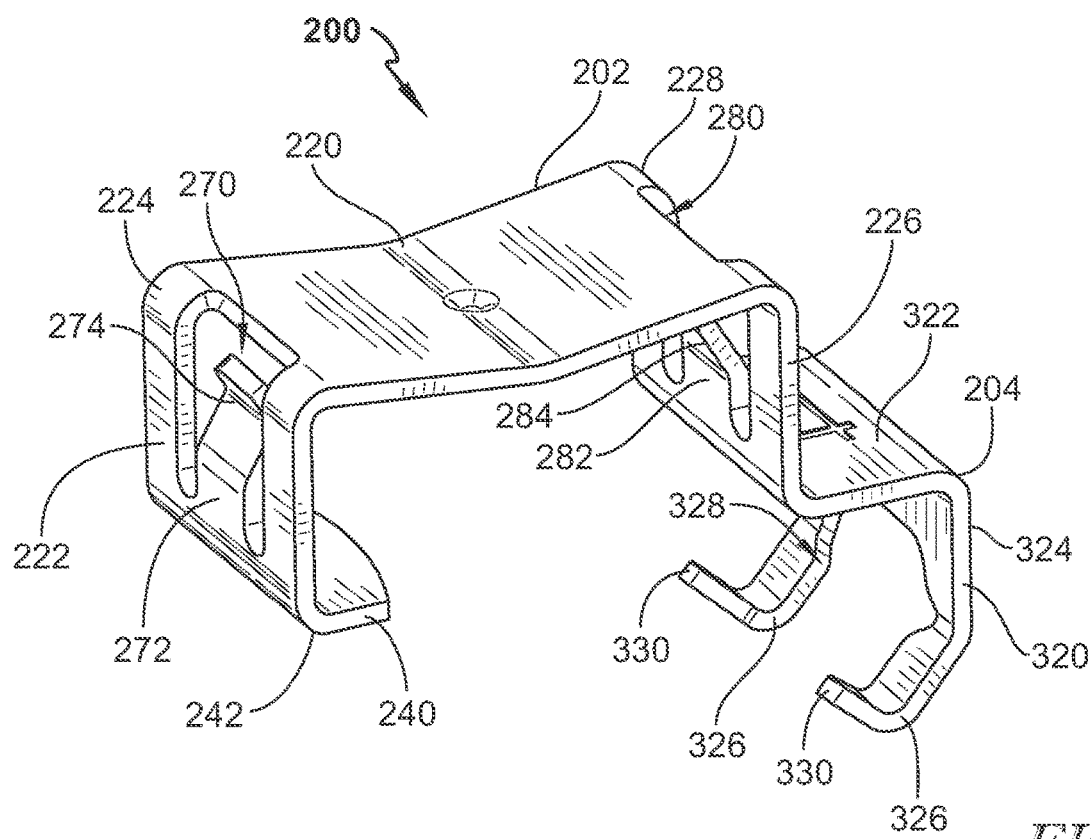
FIG. 9 is a perspective view of another locator tab formed in accordance with another embodiment.
Figure 10:
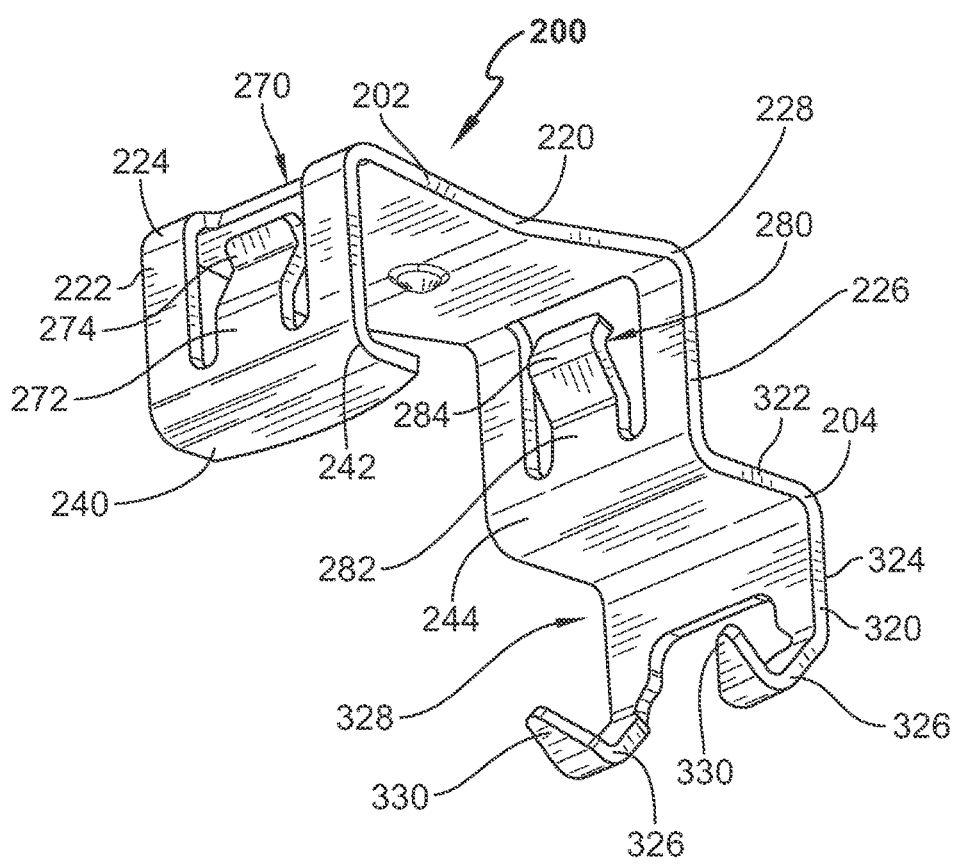
FIG. 10 is another perspective view of the locator tab shown in FIG. 9.

FIGS. 9 and 10 illustrate another embodiment of a locator tab 200. The locator tab 200 includes a main body 202 and a clamp end 204 extending from the main body 202. The main body 202 includes a top crossbar 220, a leg 222 extending from an end 224 of the crossbar 220, and a leg 226 extending from an opposite end 228 of the crossbar 220. A foot 240 extends from an end 242 of the leg 222. As illustrated in FIGS. 9 and 10, the foot 240 may extend inward. Optionally, the foot 240 may extend outward. The clamp end 204 extends from an end 244 of the leg 226.

The main body 202 includes an opening 270. The opening 270 extends through a portion of the leg 222 and the crossbar 220. The opening 270 is positioned at the end 224 of the crossbar 220. A flange 272 extends through the opening 270. The flange 272 is flexible and includes a curved section 274. The main body 202 includes another opening 280. The opening 280 extends through a portion of the leg 226 and the crossbar 220. The opening 280 is positioned at the end 228 of the crossbar 220. A flange 282 extends through the opening 280. The flange 282 is flexible and includes a curved section 284. The flanges 272 and 282 are configured to flex outward to receive the hose clamp. Once the hose clamp is positioned adjacent the crossbar 220, the flanges 272, 282 snap back into the position shown in FIGS. 9 and 10, and the hose clamp is retained between the crossbar 220 and the flanges 272, 282.

The clamp end 204 includes a hose retainer 320. The hose retainer 320 includes an upper end 322 and a side 324 extending from the upper end 322. A pair of teeth 326 extend from the side 324. Collectively, the upper end 322, the side 324, and the teeth 326 define a cavity 328 that is configured to receive a hose end. The teeth 326 include points 330 that are configured to bite into an inner hose wall of the hose end. That is, the teeth 326 are bent inward toward the inner hose wall to tighten the points 330 into the inner hose wall and secure the locator tab 200 to the hose. As will be appreciated by those skilled in the art, this design allows the hose retainer 320 to be secured to hoses of various sizes and wall thicknesses.

Figure 11:
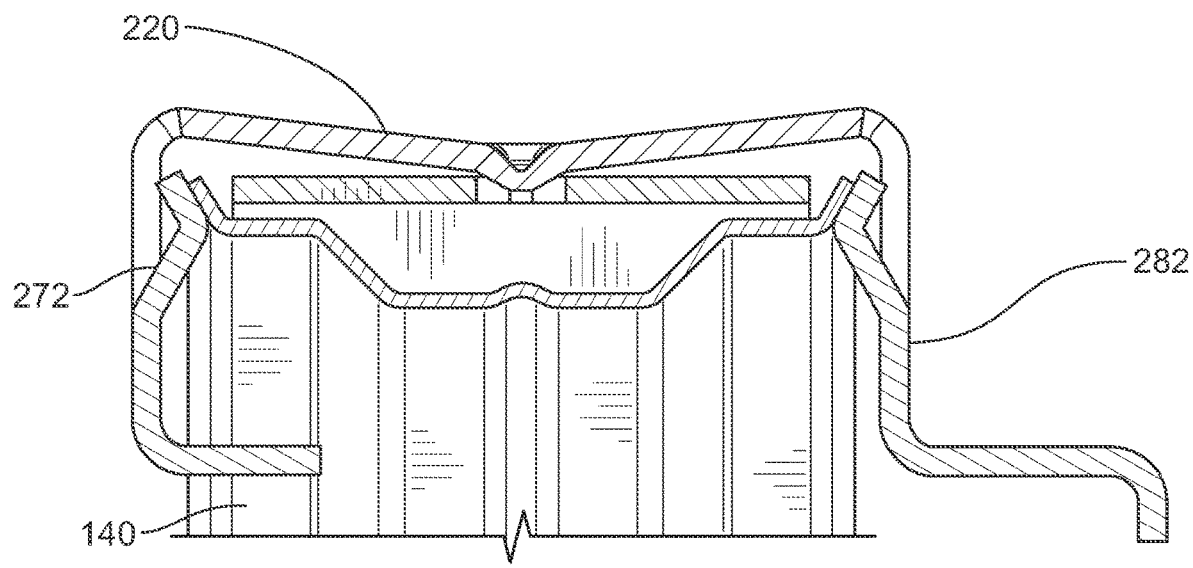
FIG. 11 is a side cross-sectional view of the locator tab shown in FIG. 9 positioned on a hose clamp.
Figure 12:
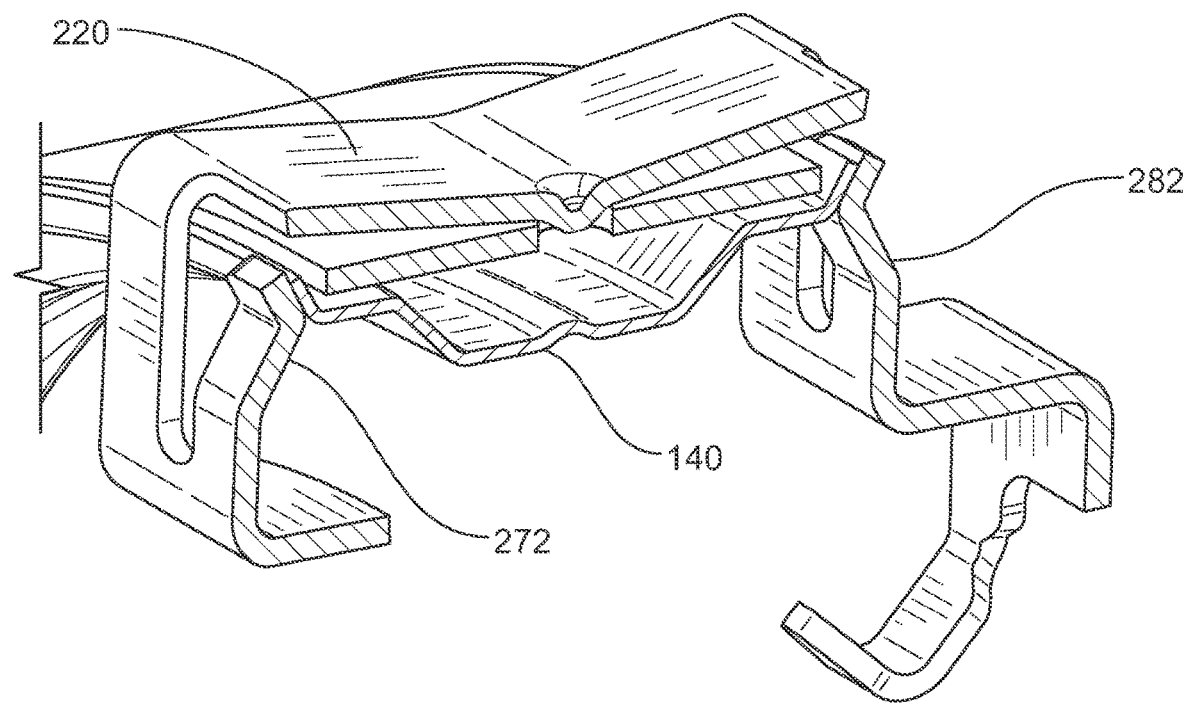
FIG. 12 is a perspective view of the cross-section of FIG. 11.
Figure 13:
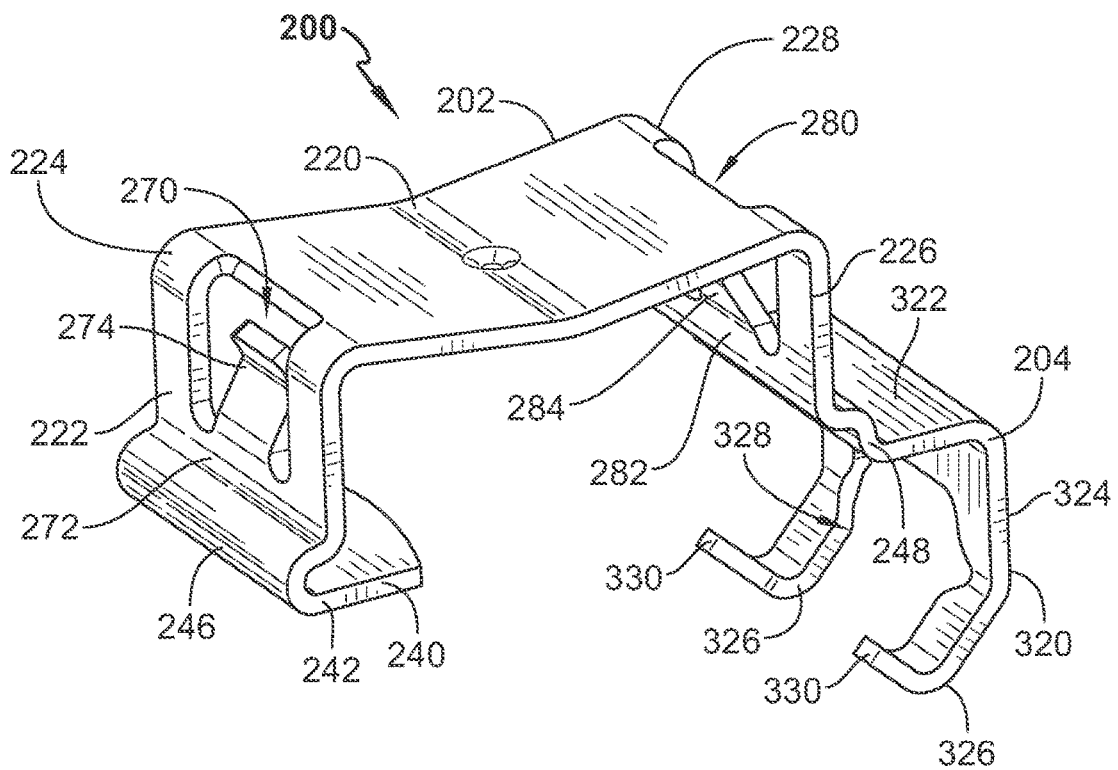
FIG. 13 is a perspective view of yet another locator tab formed in accordance with another embodiment.
Figure 14:
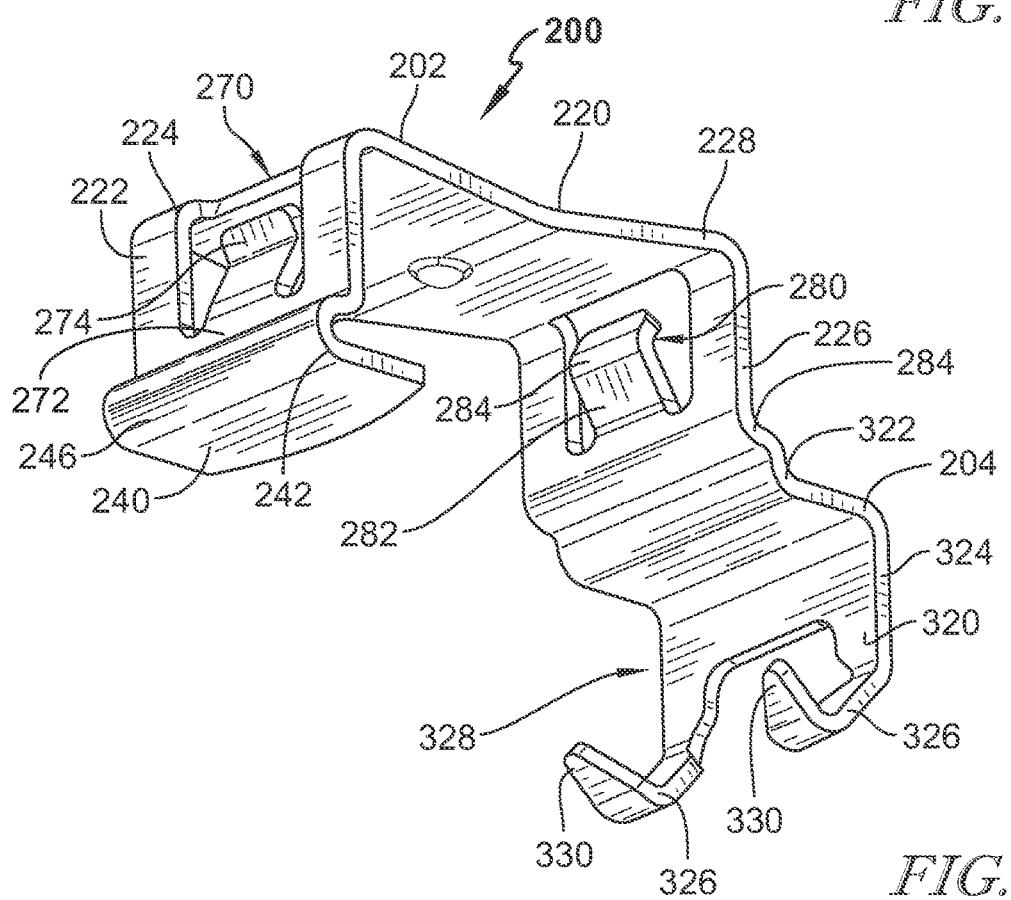
FIG. 14 is another perspective view of the locator tab shown in FIG. 13.

Accordingly, the locator tab 200 secures to both the hose clamp and the hose to position the hose clamp on the hose for assembly. In this configuration, the hose can be shipped to an end user with the hose clamp secured thereto. This enables the end user to save time by positioning the hose and hose clamp on the pipe at the same time. FIGS. 11 and 12 illustrate the hose clamp 140 positioned between the crossbar 220 and the flanges 272, 282. FIGS. 13 and 14 illustrate an alternative embodiment of the locator tab 200, where the leg 222 includes a jogged out portion 246. Additionally, as shown in FIGS. 13 and 14, the leg 226 may include a jogged out portion 248.

Figure 26:
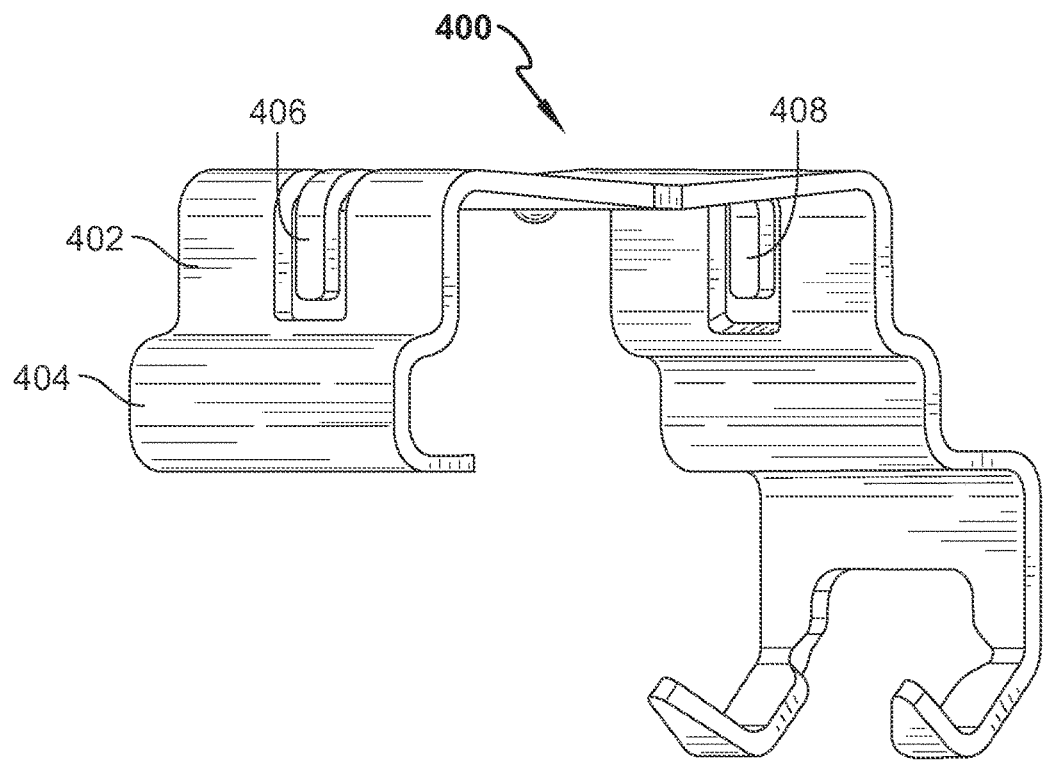
FIG. 26 is a perspective view of still another embodiment of a locator tab in an open configuration.
Figure 27:
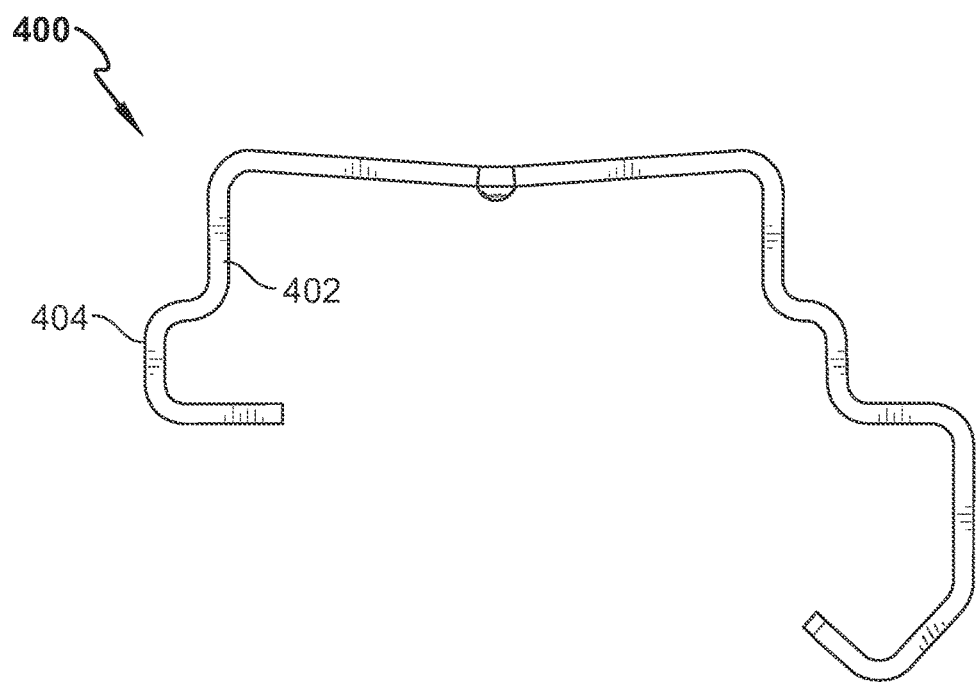
FIG. 27 is a side view of the locator tab shown in FIG. 26 in the open configuration.
Figure 28:
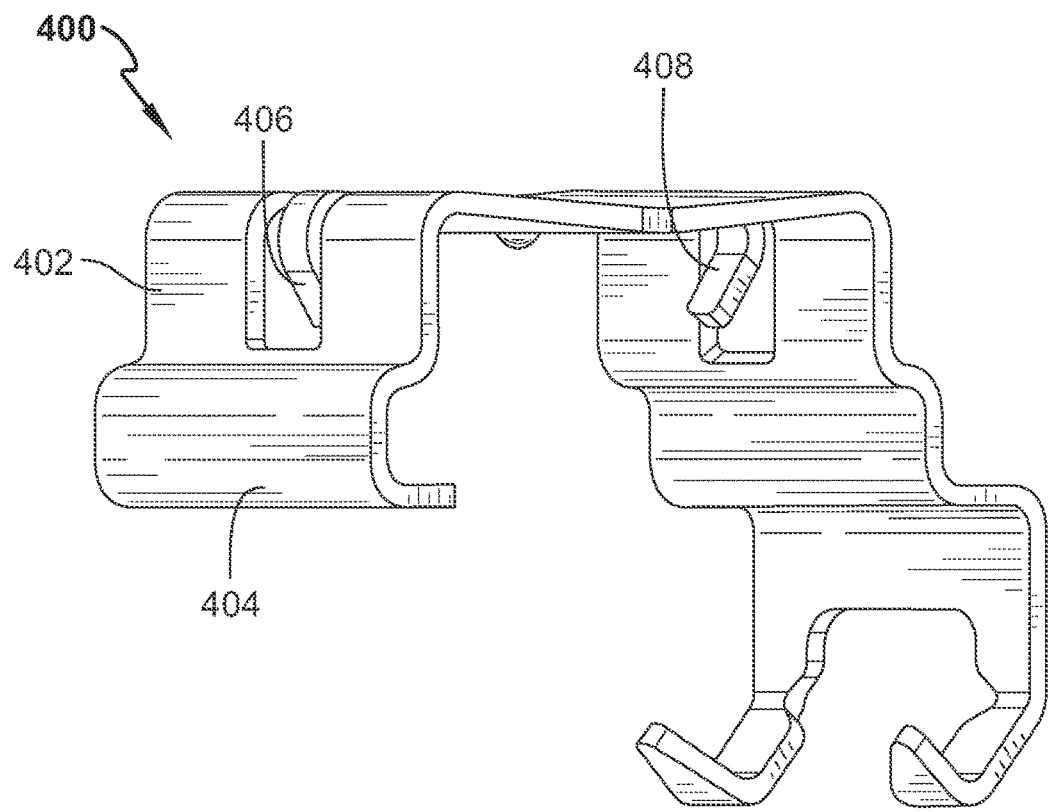
FIG. 28 is a perspective view of the locator tab shown in FIG. 26 in a closed configuration.
Figure 29:
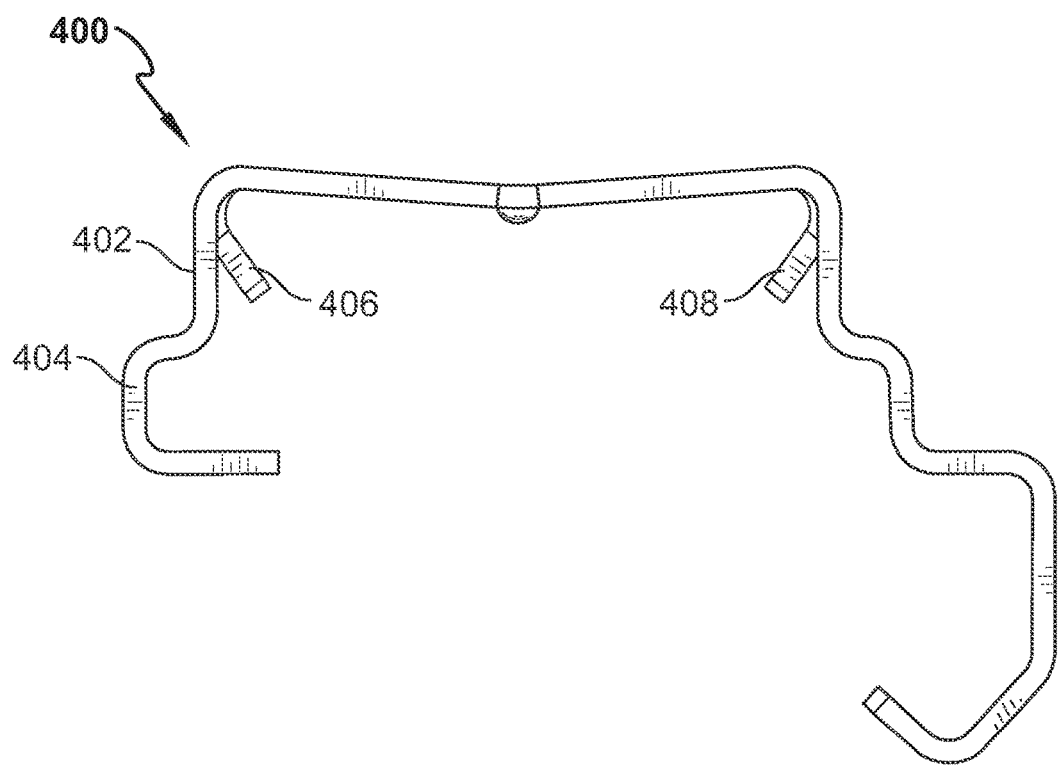
FIG. 29 is a side view of the locator tab shown in FIG. 26 in the closed configuration.
Figure 31:
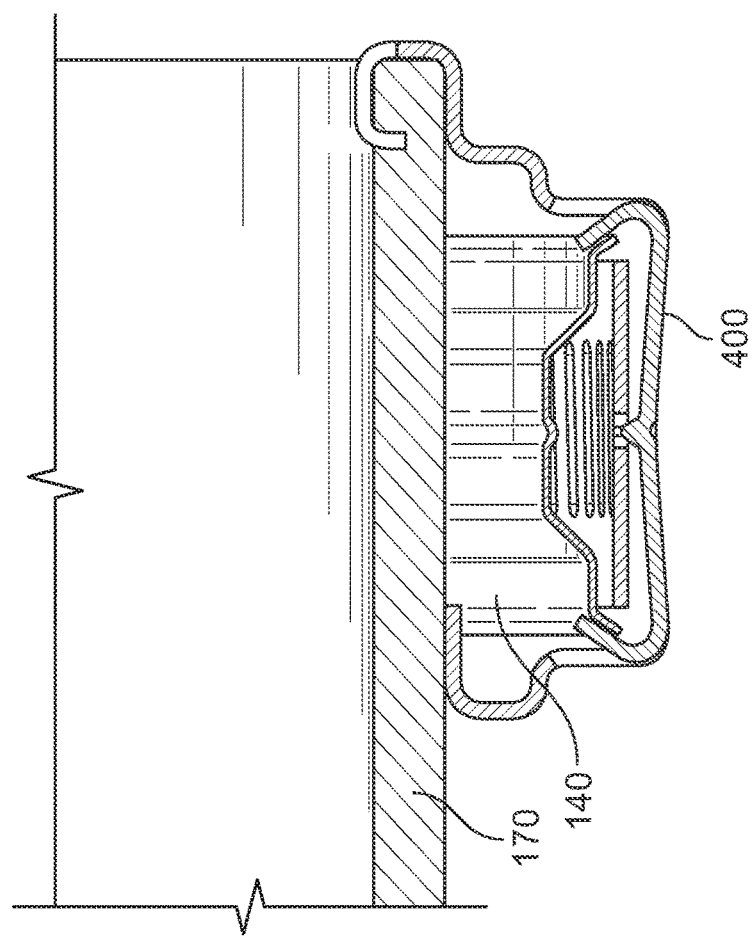
FIG. 31 is a detailed cross-sectional view of the hose clamp positioned on the hose with a locator tab of the embodiment shown in FIGS. 26-29 (showing detail from the bottom portion of FIG. 30)
Figure 30:
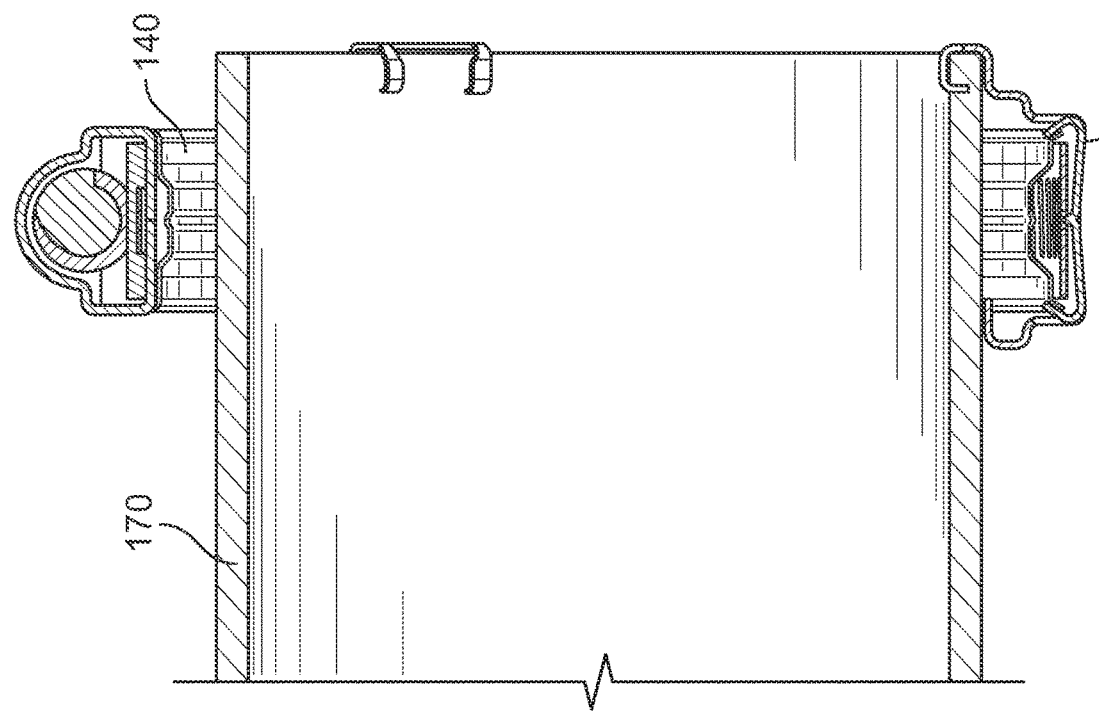
FIG. 30 is a side cross-sectional view of a hose clamp positioned on a hose using locator tabs of the embodiment shown in FIGS. 26-29.

FIGS. 25-29 illustrate an embodiment of a locator tab 400 having a leg 402 with a jogged feature 404. FIGS. 26 and 27 illustrate flanges 406 and 408 of the locator tab 400 in an open configuration that enables the locator tab 400 to position on a hose clamp 140. FIGS. 28 and 29 illustrate the flanges 406 and 408 in a closed configuration that secures the locator tab 400 to the hose clamp 140. FIGS. 30 and 31 show the hose clamp 140 secured to the hose 170 utilizing the locator tab 400.

Figure 32:
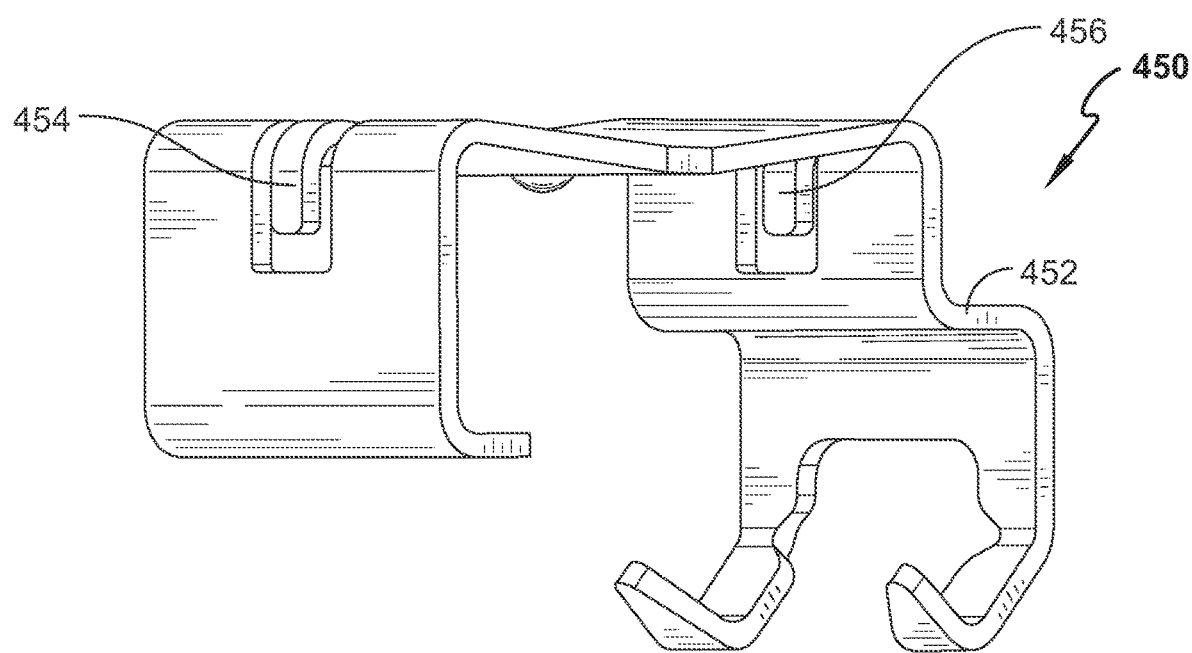
FIG. 32 is a perspective view of a further embodiment of a locator tab in an open configuration.
Figure 33:
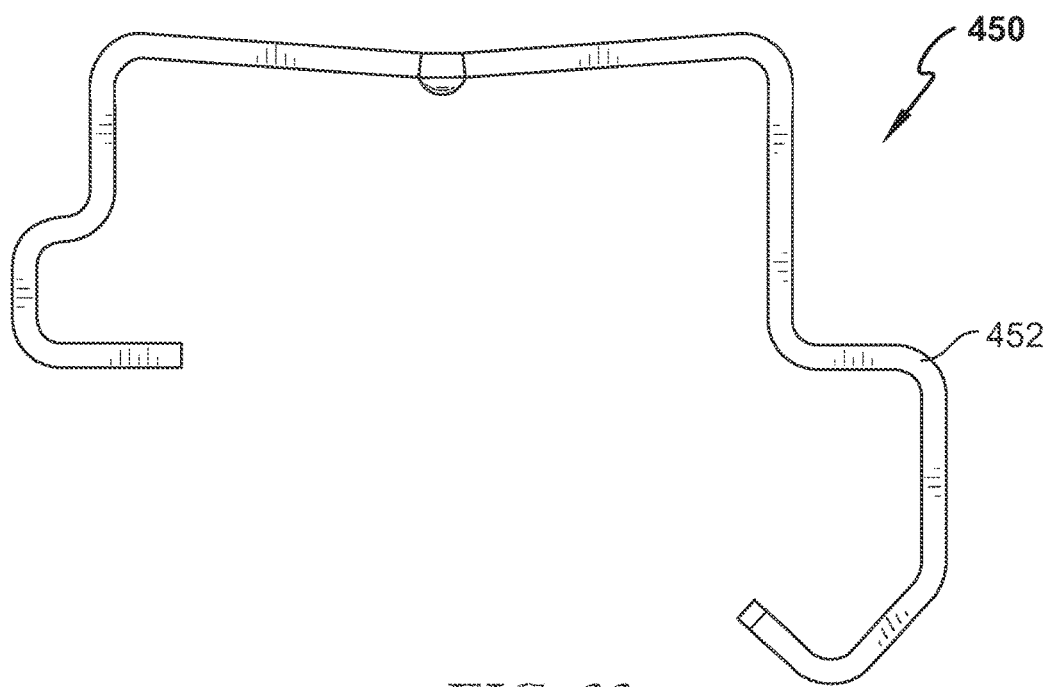
FIG. 33 is a side view of the locator tab shown in FIG. 32 in the open configuration.
Figure 34:
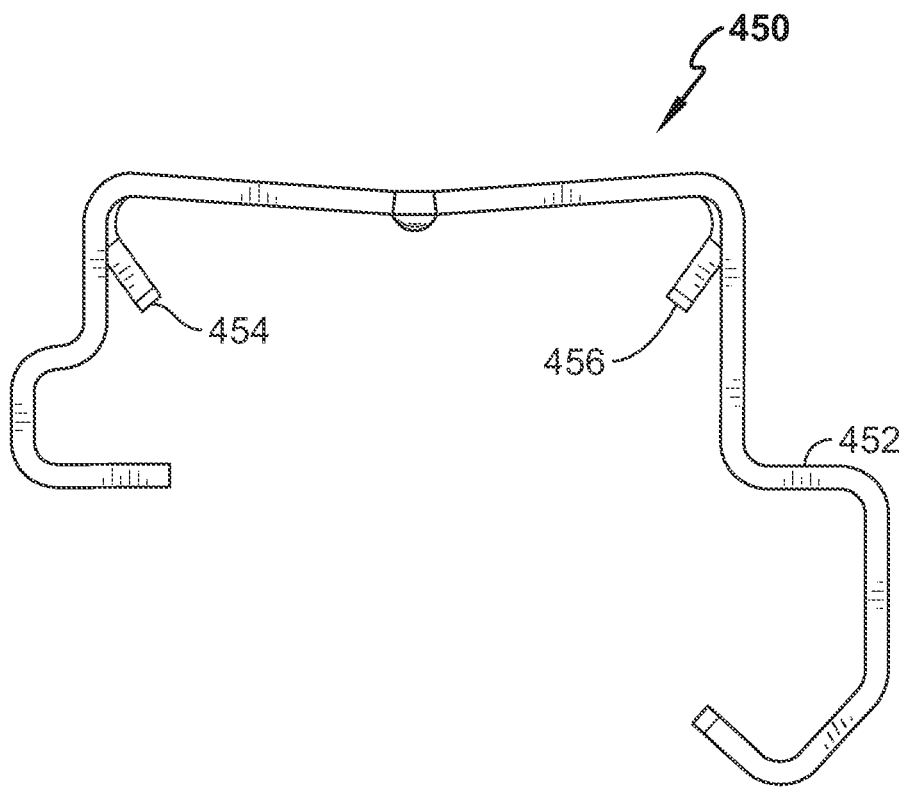
FIG. 34 is a side view of the locator tab shown in FIG. 32 in a closed configuration.
Figure 35:
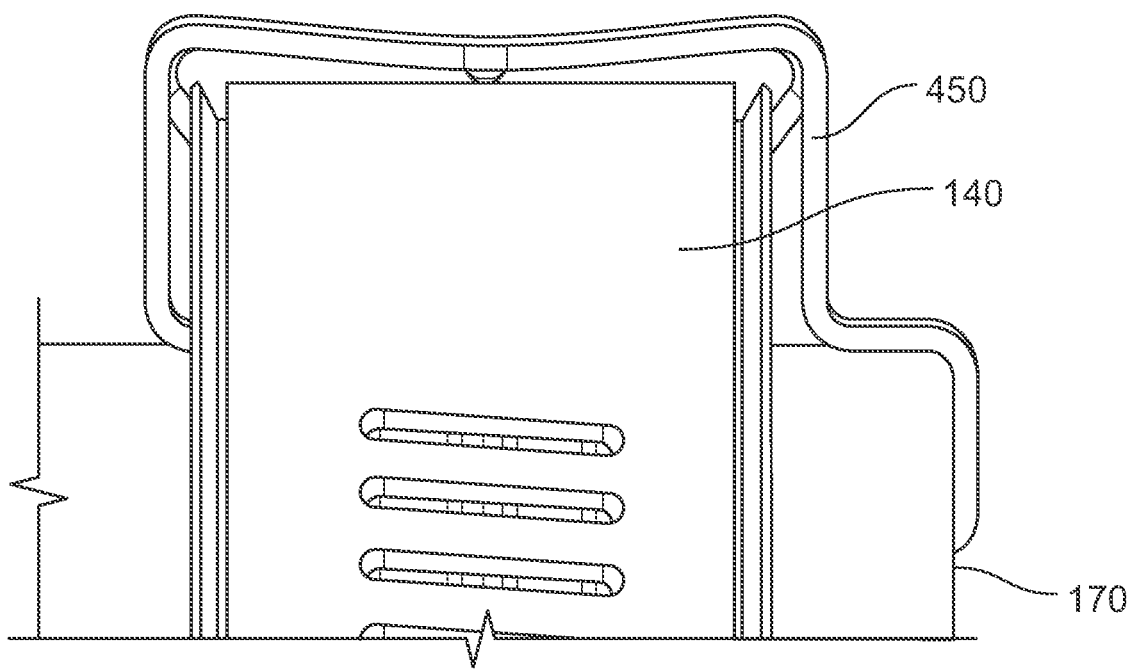
FIG. 35 is a side view of the locator tab shown in FIG. 32 in the closed configuration, positioning a hose clamp on a hose.
Figure 37:
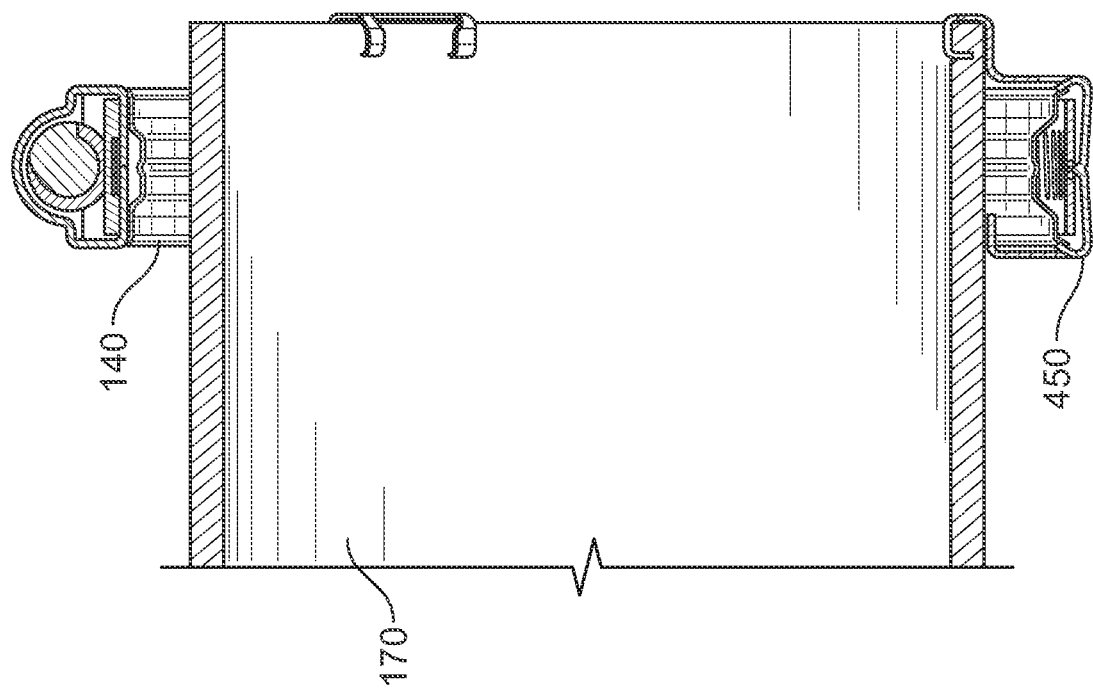
FIG. 37 is a side cross-sectional view showing two locator tabs of the embodiment shown in FIGS. 32-35 positioning the hose clamp on the hose.
Figure 36:
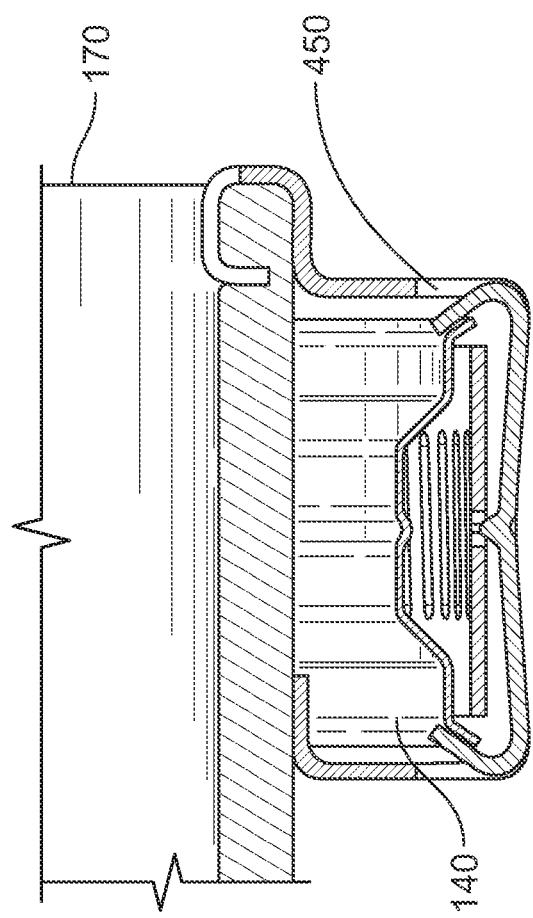
FIG. 36 is a side cross-sectional view of the locator tab of the embodiment shown in FIGS. 32-35 positioning the hose clamp on the hose.
Figure 38:
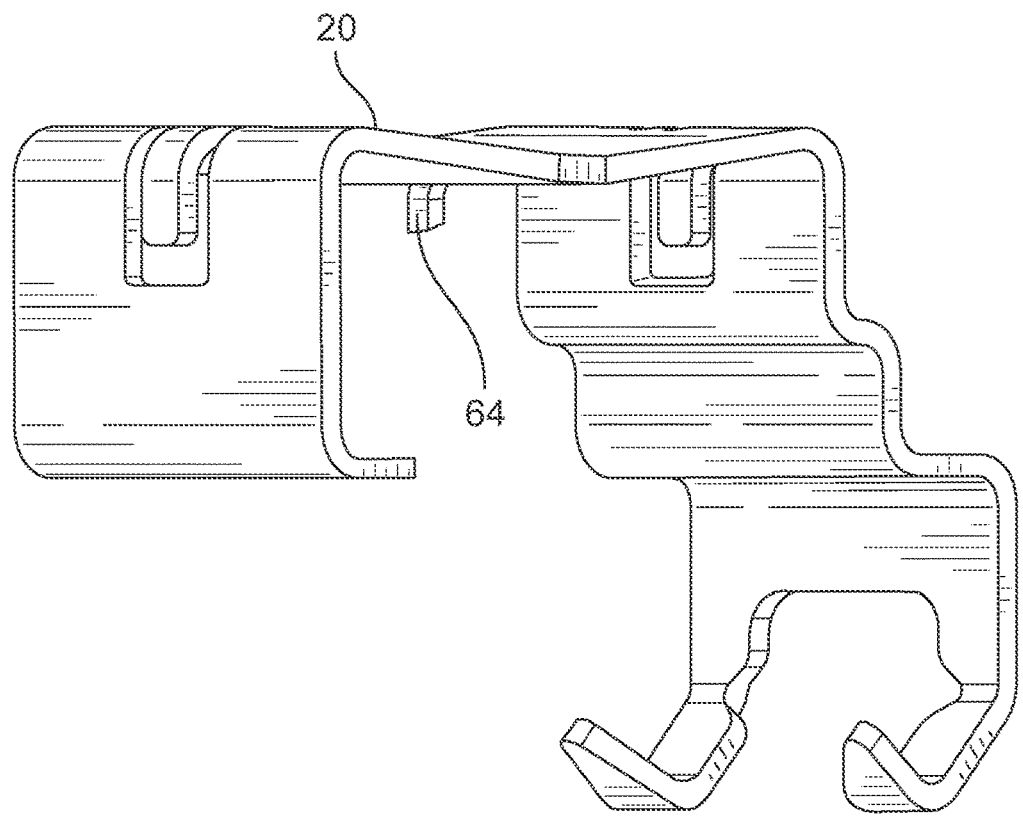
FIG. 38 is a perspective view of a still further embodiment of a locator tab in an open configuration.
Figure 39:
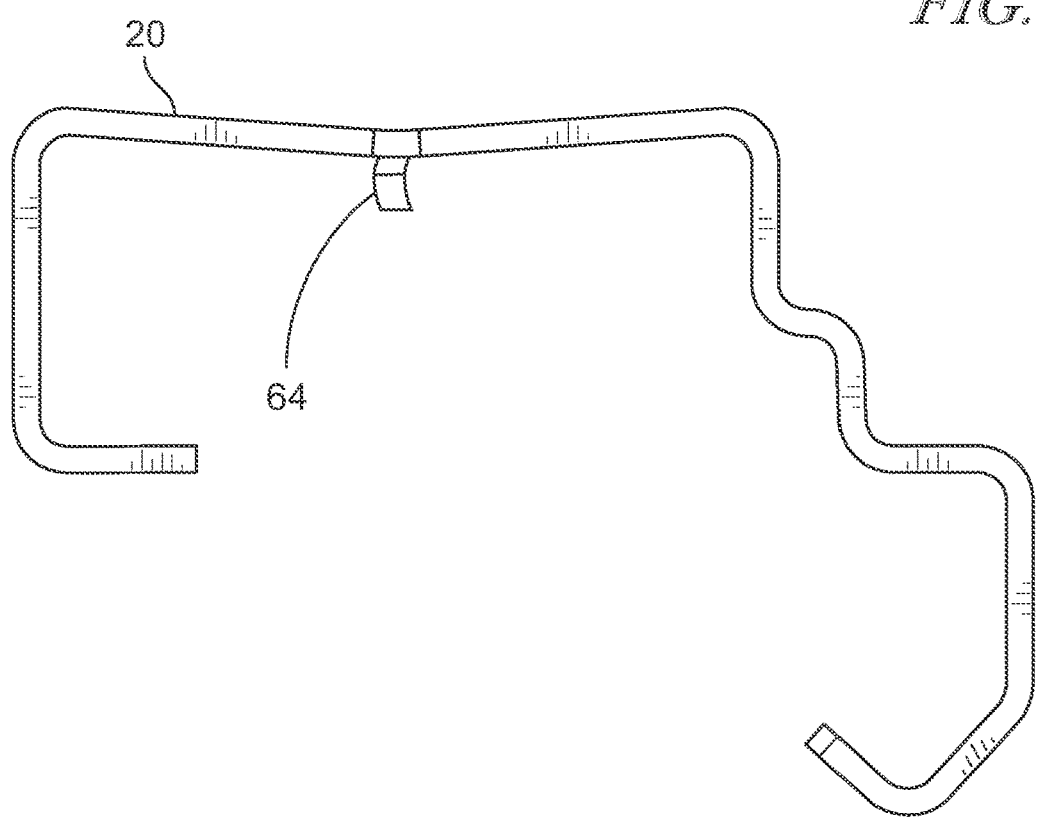
FIG. 39 is a side view of the locator tab shown in FIG. 38 in the open configuration.
Figure 40:
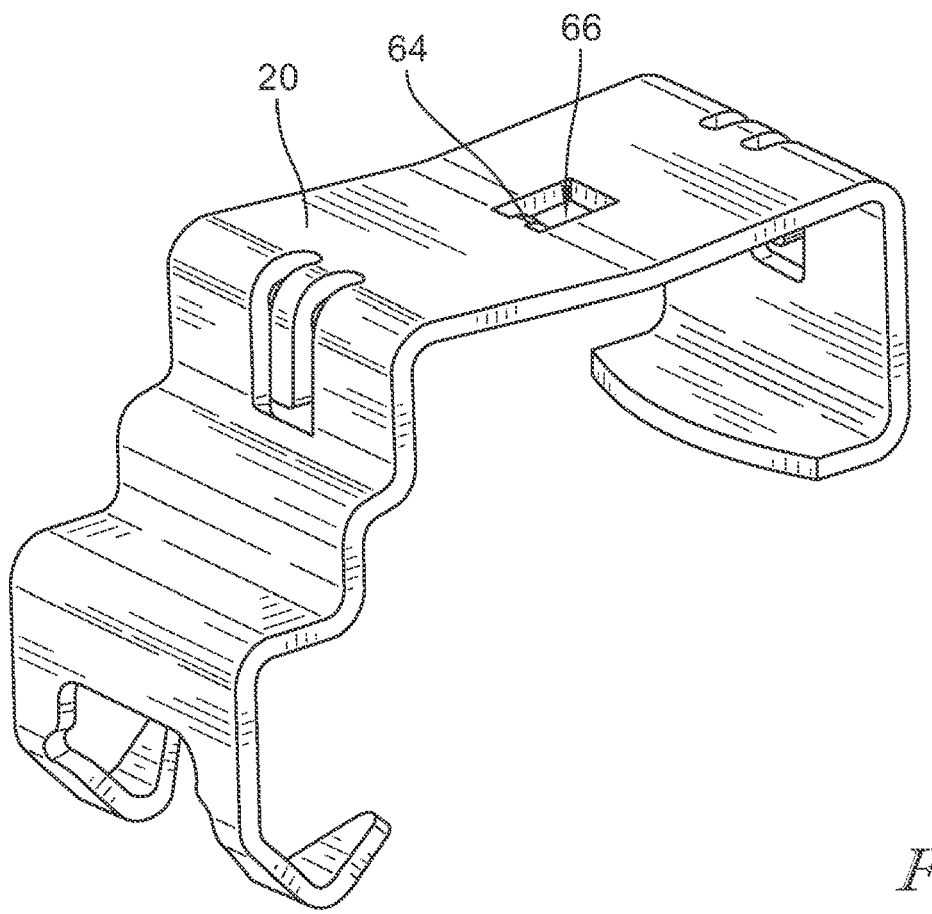
FIG. 40 is another perspective view of the locator tab shown in FIG. 38 in the open configuration.
Figure 41:
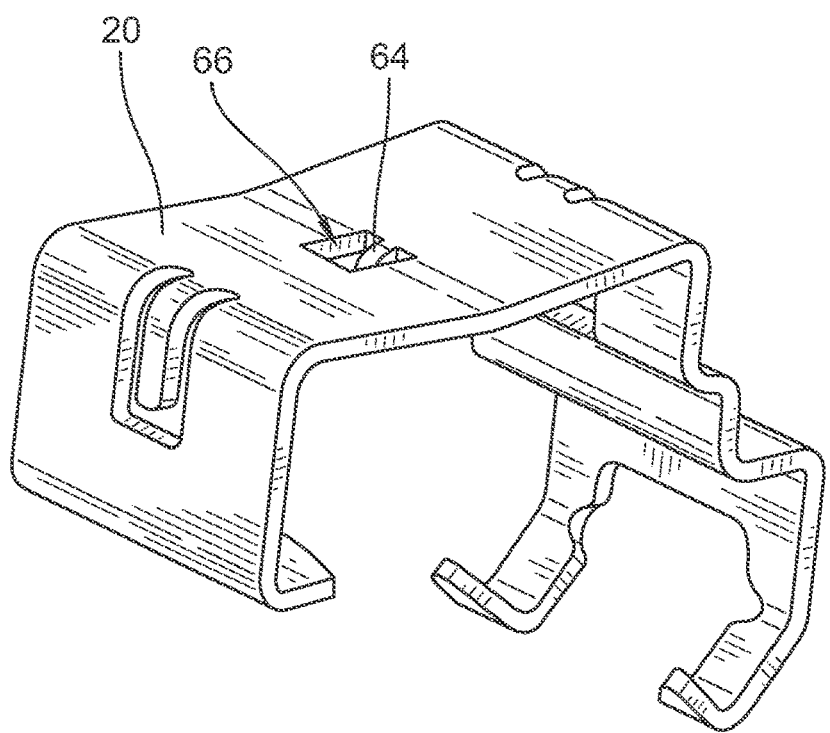
FIG. 41 is yet another perspective view of the locator tab shown in FIG. 38 in the open configuration.

FIGS. 32-37 illustrate another embodiment of a locator tab 450 having no jogged feature in the leg 452. FIGS. 32 and 33 illustrate the locator tab 450 having flanges 454 and 456 in an open configuration to enable the locator tab 450 to be coupled to the hose clamp 140. FIGS. 35-37 illustrate the locator tab 450 utilized to couple the hose clamp 140 to the hose 170.

As shown in FIG. 36 (as well as FIGS. 18, 22, 23, 25, 30, 31, 37, and 45), the teeth 126, 326, 552 of the locator tab may be configured such that, when engaged with the inner surface of the hose 170, an inner surface of each tooth is flush with the inner surface of the hose. It is also contemplated that in some embodiments, engagement of the teeth 126, 326, 552 of the locator tabs with the inner surface of the hose may compress the hose to some degree. For instance, in some embodiments, engagement of the teeth 126, 326, 552 of the locator tabs with the inner surface of the hose may compress the hose such that an outer surface of each tooth is flush with (or even recessed below) the inner surface of uncompressed portions of the hose. Such configurations may decrease interference between the locator tab(s) and a pipe when the hose is being installed on the pipe.

Figure 42:
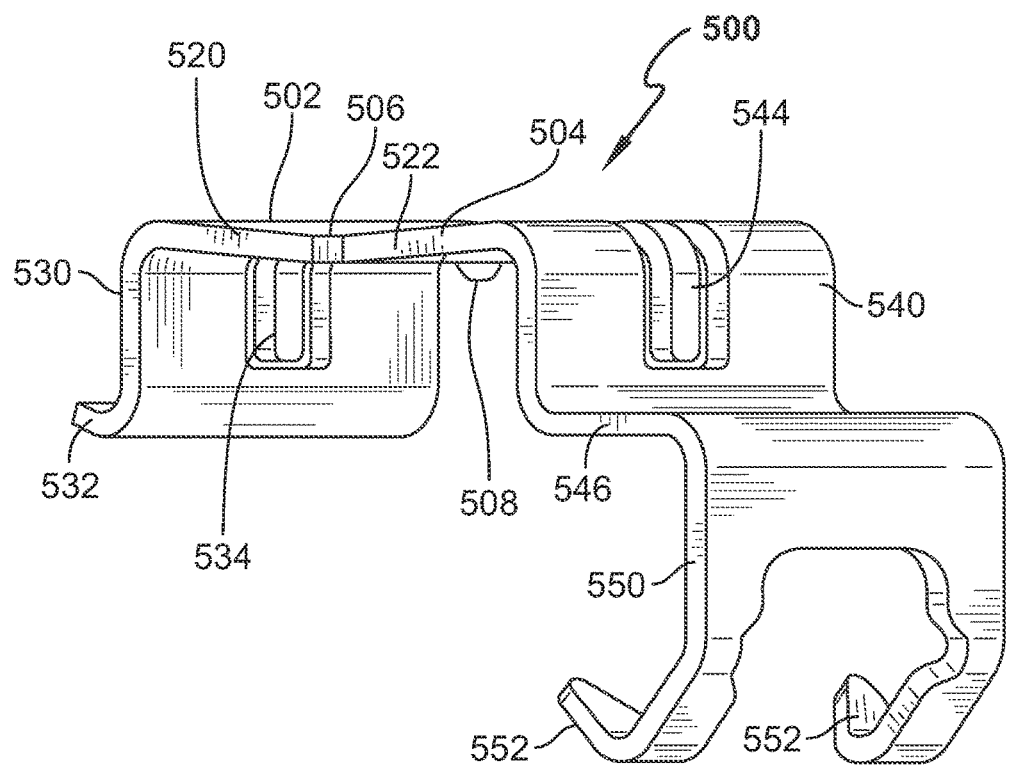
FIG. 42 is a perspective view of an additional embodiment of a locator tab.
Figure 43:
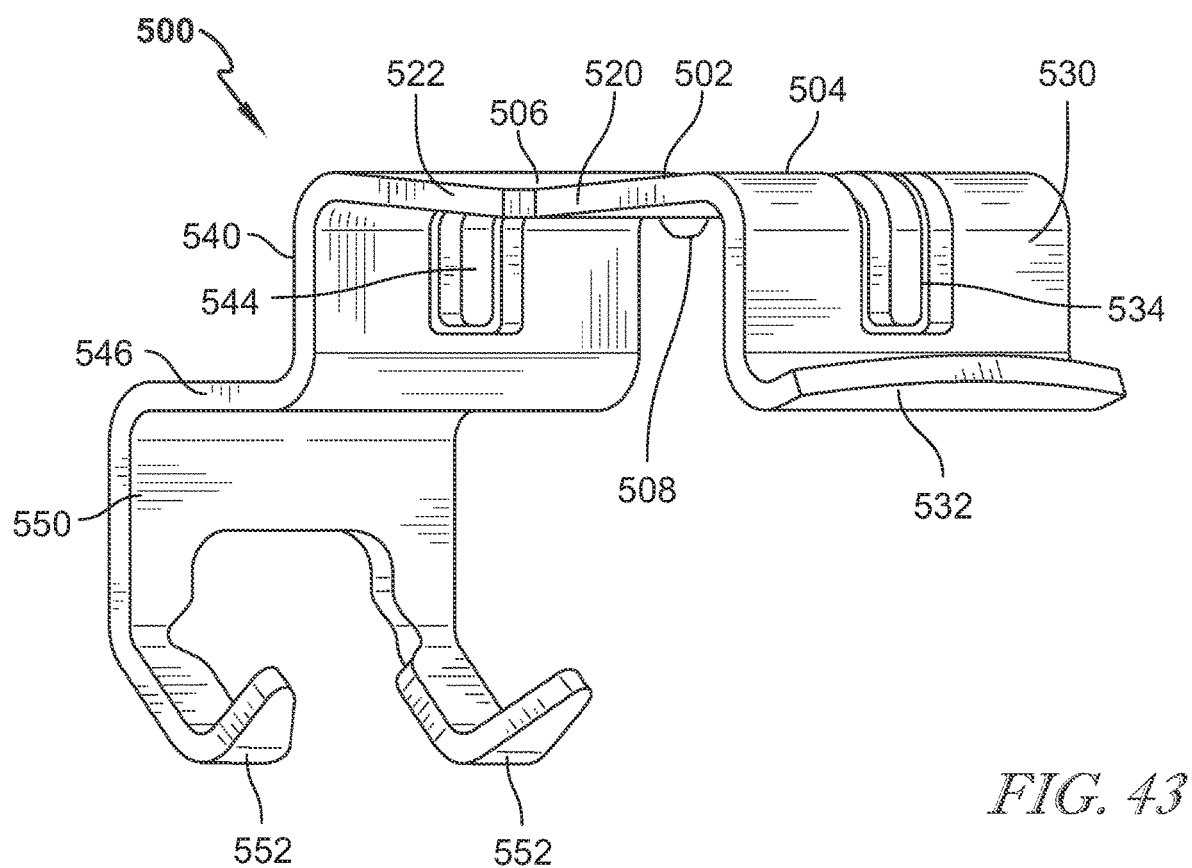
FIG. 43 is another perspective view of the locator tab shown in FIG. 42.
Figure 44:
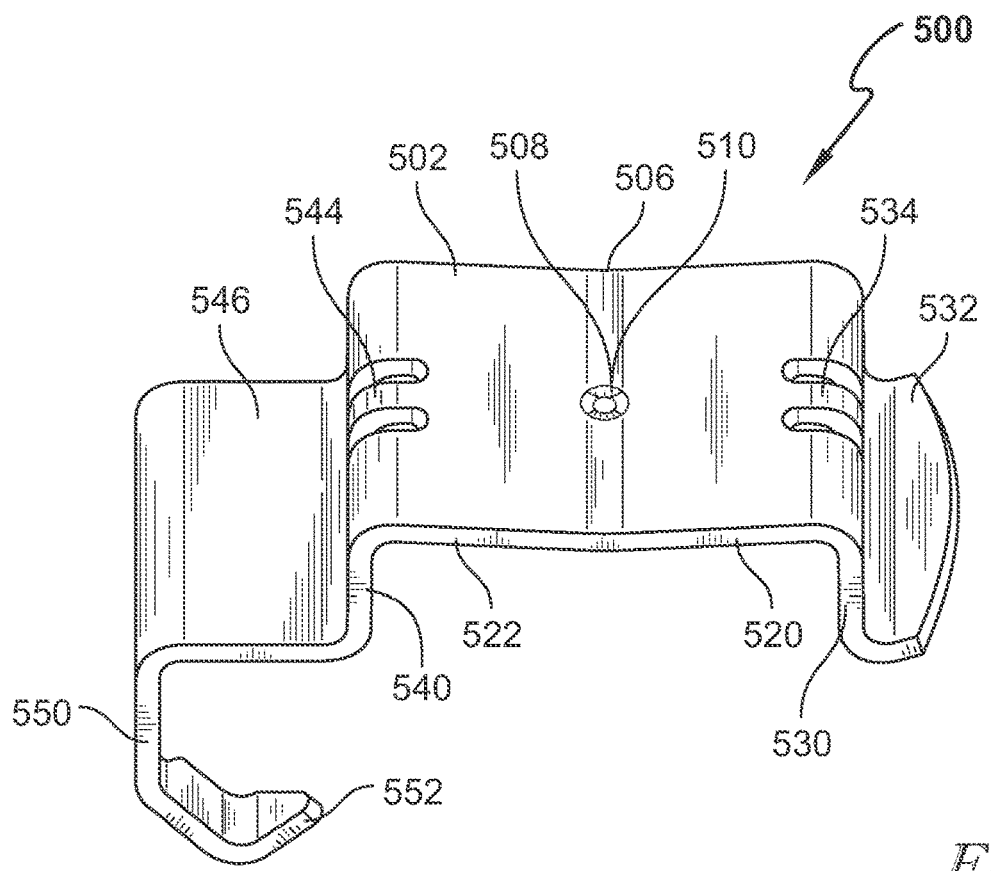
FIG. 44 is yet another perspective view of the locator tab shown in FIG. 42.

Referring now to FIGS. 42-44, a locator tab 500 includes a main body 502 having a crossbar 504. The crossbar 504 includes a center beam 506 that is rounded about a radius. The center beam 506 includes a detent 508 that is configured to position in a recess formed in a band of a hose clamp, as described in more detail below. The detent 508 is positioned at a center 510 of the center beam 506 and extends downward from the center beam 506. In some embodiments, the detent 508 may extend any length of the center beam 506.

A crossbar segment 520 extends from the center beam 506 at a non-orthogonal angle relative to the center beam 506. Another crossbar segment 522 extends from the center beam 506 at a non-orthogonal angle relative to the center beam 506. The crossbar segment 522 extends from the center beam 506 in an opposite direction from the crossbar segment 520. In the illustrated embodiment, the crossbar segment 520 and the crossbar segment 522 extend at substantially the same non-orthogonal angle. In some embodiments, the crossbar segment 520 and the crossbar segment 522 may extend at different angles.

A leg 530 of the main body 502 extends from the crossbar segment 520. The crossbar segment 520 is angled relative to the leg 530 at a first degree. The leg 530 extends downward from the crossbar 504. An arm 532 extends outward from the leg 530 and is configured to be positioned on an outer surface of the hose, as described in more detail below. A flange 534 is formed in the leg 530. The flange 534 is initially planar with the leg 530. When the locator tab 500 is secured to the hose, the flange 534 is bent inward so that the hose positions between the flange 534 and the crossbar 504.

A leg 540 of the main body 502 extends from the crossbar segment 522. The crossbar segment 522 is angled relative to the leg 540 at a second degree. In the illustrative embodiment, the first degree of the angle between the crossbar segment 520 and the leg 530 is the same as the second degree of the angle between the crossbar segment 522 and the leg 540. In some embodiments, the first degree of the angle between the crossbar segment 520 and the leg 530 is different than the second degree of the angle between the crossbar segment 522 and the leg 540. A flange 544 is formed in the leg 540. The flange 544 is initially planar with the leg 540. When the locator tab 500 is secured to the hose, the flange 544 is bent inward so that the hose positions between the flange 544 and the crossbar 504.

An arm 546 extends outward from the leg 540. A clamp end 550 extends from the arm 546. The clamp end 550 includes a pair of teeth 552 that are configured to be bent inward to secure to an inner surface of the hose, as described in more detail below. In some embodiments, the clamp end 550 may include any number of teeth 552.

Figure 45:
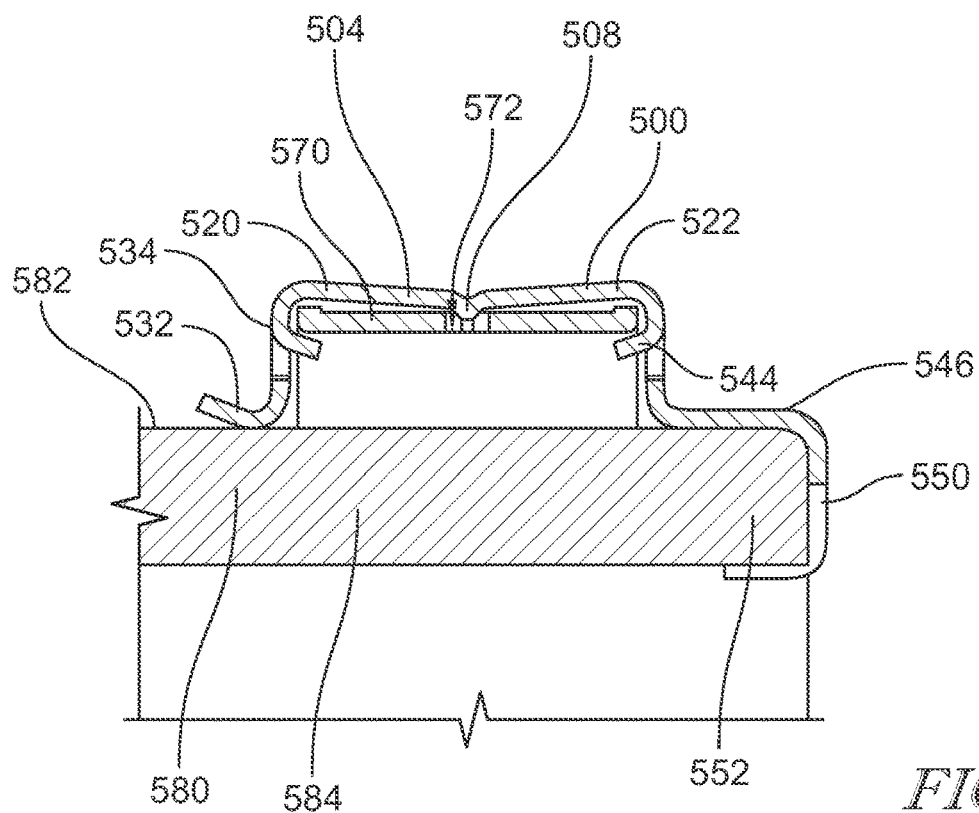
FIG. 45 is a cross-sectional view of the locator tab shown in FIG. 42 positioning a hose clamp on a hose.
Figure 46:
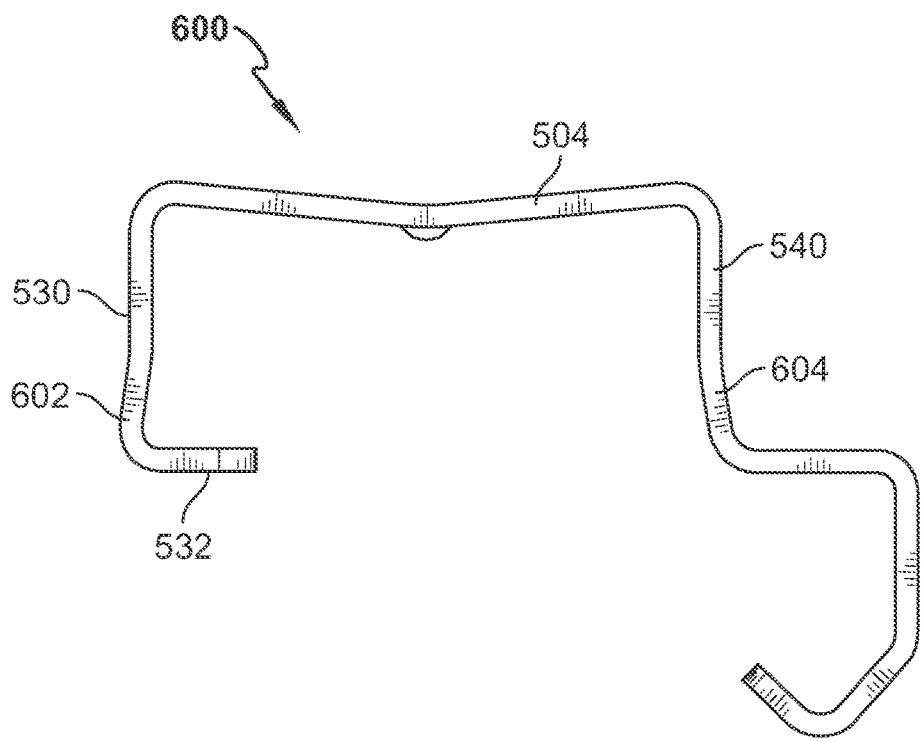
FIG. 46 is a side view of a still another embodiment of a locator tab.
Figure 47:
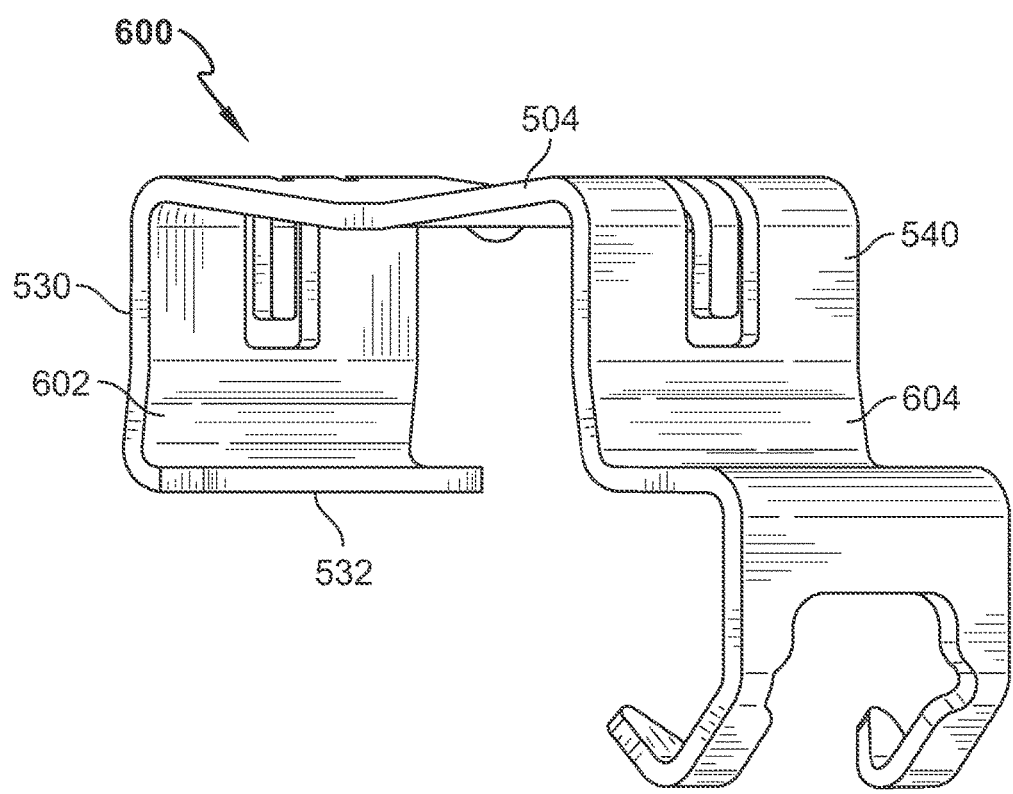
FIG. 47 is a perspective view of the locator tab shown in FIG. 46.
Figure 48:
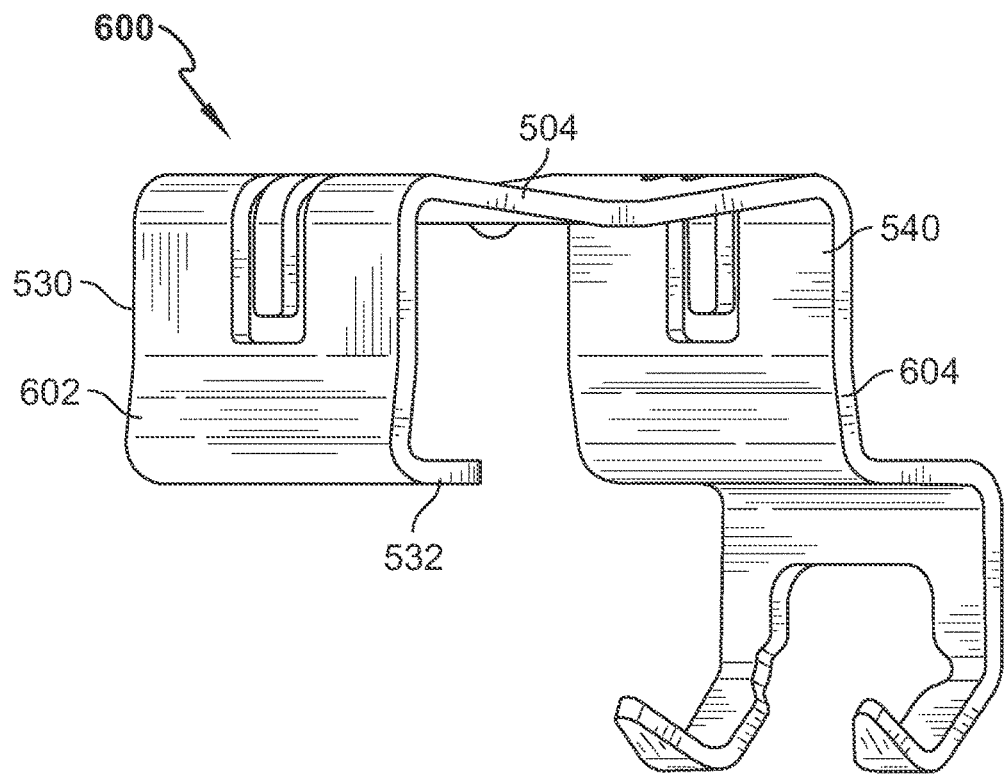
FIG. 48 is another perspective view of the locator tab shown in FIG. 46.
Figure 49:
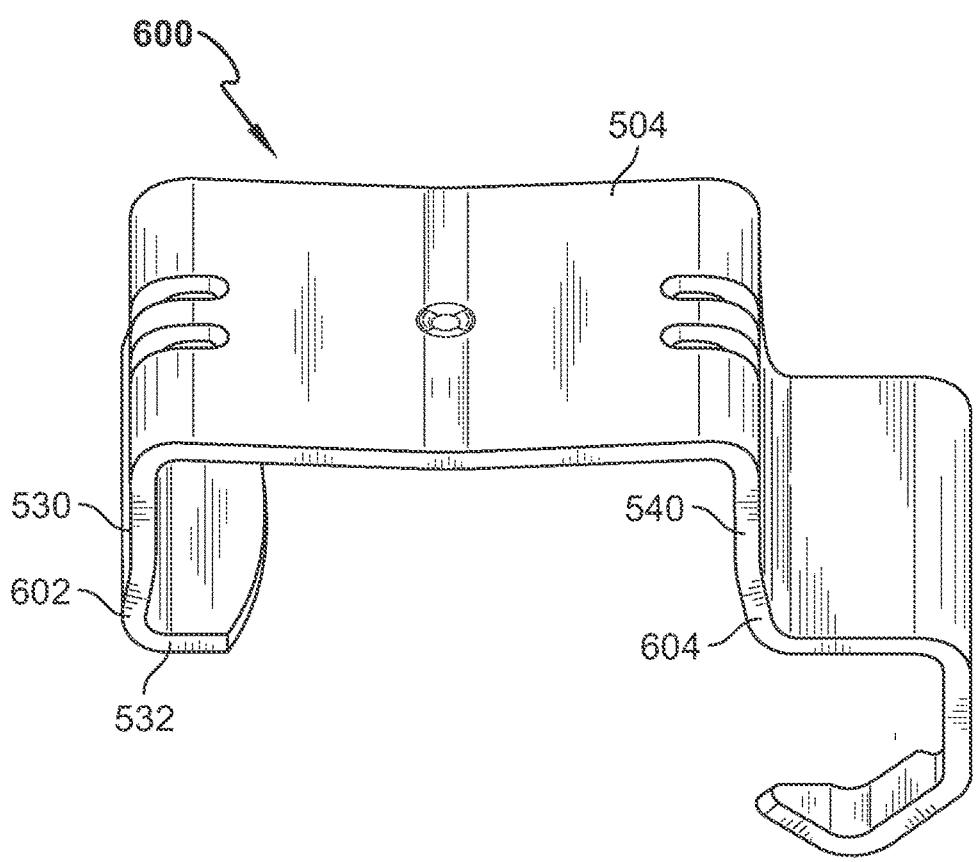
FIG. 49 is yet another perspective view of the locator tab shown in FIG. 46.

FIG. 45 illustrates the locator tab 500 used to position a hose clamp 570 relative to a hose 580. As illustrated in FIG. 45, the hose clamp 570 is secured between the crossbar 504 and the flanges 534, 544 such that the crossbar 504 is in a non-parallel position relative to the hose clamp 570. That is the crossbar segment 520 and the crossbar segment 522 are angled such that the crossbar 504 is non-parallel to the hose clamp 570. The detent 508 is positioned within a recess 572 formed in the band of the hose clamp 570.

The locator tab 500 is also secured to the hose 580. Each arm 532 and 546 is secured against an outer surface 582 of the hose 580. The clamp end 550 of the locator tab 500 is bent inward such that the teeth 552 engage an inner surface 584 of the hose 580. In this configuration the locator tab 500 secures the hose clamp 570 to the hose 580 in an untighten position. As the hose clamp 570 is tightened to the hose 580, the flanges 534, 544 flex outward so that the hose clamp 570 is pulled inward against the outer surface 582 of the hose and secure thereto. In some embodiments, the locator tab 500 is removed once the hose clamp 570 is tightened around the hose 580. In other embodiments, the locator tab 500 remains on the hose clamp 570 once the hose clamp 570 is tightened around the hose 580.

The locator tab 600 shown in FIGS. 46-49 includes all of the features of the locator tab 500; however, the arm 532 is angled inward. In this embodiment, the arm 532 is still configured to abut the outer surface of the hose. The locator tab 600 of FIGS. 46-49 also differs from the locator tab 500 in that each of the legs 530, 540 includes a flare 602, 604 at its end opposite the crossbar 504. Each of the flares 602, 604 is angled outwardly to provide increased spacing between the legs 530, 540 at their ends that are opposite the crossbar 504. This increased spacing provides clearance to allow travel of a band and/or a liner of a hose clamp relative to the locator tab 600 (similar to the flare 100 of locator tab 10 discussed above).

The embodiments described above provide systems and methods for pre-positioning hose clamps, for example hose clamps used in the automotive industry, in the correct orientation and position for installation. The embodiments provide a positioning system that will not interfere with the installation method or reduce the clamp's efficiency in sealing for coolant and air management applications. Previous designs have utilized a combination of two or three different retaining clips, some of which are permanently attached or welded to the clamp component, which can interfere with the clamp's sealing efficiency upon installation. The embodiments described herein include locator tabs that are crimped to the hose clamp and to the hose in as few as two locations and that will completely release the hose clamp during the installation process.

A number of metrics have been used to evaluate the effectiveness of the embodiments described herein. A first metric used was a "deflection test" that evaluates the radial orientation and lateral stability of the clamp, which reflects the effort that a line operator must use to locate and maintain engagement with the screw head of the hose clamp during the torque run-down process used during installation. The OEM specification for the lateral stability evaluation criteria currently uses a maximum deflection of the screw when the screw is subjected to a predetermined force along a normal axis that is formed between the hose and an interface. Early testing shows that the above-described embodiments align with the specification. Notably, the test results also indicate a reduction in "as-shipped" Ø below a nominal value that will help minimize the deflection value.

A second metric used was a measure of an amount of radial load that is transmitted from the screw torque input into the hose inner diameter and is measured at a sealing surface. While no OEM specification exists, this measurement method is commonly published to the OEMs as a means of evaluating sealing efficiency. For the embodiments described herein, there is an increase in radial load and/or reduction in variation compared to the other previous attachment methods. This increase in performance is due to the elimination of sliding friction and an elimination of welded tab features that can restrict hose conformance.

A third metric used was an evaluation of the "push-on" (ergonomic) force that is required to insert the assembly over an interface. Data from this testing shows that the above-described embodiments produce readings well below the accepted specification limit. By contrast, prior designs could easily exceed this limit due to hose distortion created by different locating tab features that were permanently fixed to the clamp component. In summary, the embodiments described herein provide a robust, but "temporary," fixation that will guide but not restrict the tightening procedure.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

What is claimed is:

1. A locator tab for a hose clamp, the locator tab comprising:

a main body comprising (i) a crossbar having a first segment and a second segment coupled to the first segment by a center beam, (ii) a first leg extending at a non-orthogonal angle from the first segment, and (iii) a second leg extending at a non-orthogonal angle from the second segment, a clamp end extending from the main body and configured to be secured to a hose, and at least one flange extending from the main body and configured to retain a band of the hose clamp between the at least one flange and the crossbar until the band is tightened around the hose, wherein the crossbar is non-parallel to the band when the band is retained between the at least one flange and the crossbar.

2. The locator tab of claim 1, wherein the center beam comprises a detent configured to engage a recess formed in the band of the hose clamp when the band is retained between the at least one flange and the crossbar.

3. The locator tab of claim 1, wherein the first segment is angled at a first degree relative to the first leg, and wherein the second segment is angled at a second degree relative to the second leg.

4. The locator tab of claim 2, wherein the first degree is the same as the second degree.

5. The locator tab of claim 1, wherein the crossbar comprises a detent configured to engage a recess formed in the band of the hose clamp when the band is retained between the at least one flange and the crossbar.

6. The locator tab of claim 1, wherein the at least one flange comprises a pair of flanges extending from the main body.

7. The locator tab of claim 6, wherein the pair of flanges includes a first flange formed in the first leg and a second flange formed in the second leg.

8. The locator tab of claim 1, wherein the first leg includes an arm configured to abut an outer surface of the hose.

9. The locator tab of claim 1, wherein the clamp end extends from the second leg.

10. The locator tab of claim 1, wherein the clamp end includes at least one tooth configured to engage an inner surface of the hose.

11. The locator tab of claim 10, wherein the at least one tooth is configured to be flush with the inner surface of the hose when the at least one tooth is engaged with the inner surface.

12. The locator tab of claim 1, wherein the second leg includes a flare to provide clearance for the band as the band is tightened around the hose.

13. The locator tab of claim 12, wherein the first leg includes a flare to provide clearance for the band as the band is tightened around the hose.

14. The locator tab of claim 1, wherein the crossbar, the first leg, and the second leg collectively form an M-shape.

15. The locator tab of claim 1, wherein the at least one flange is configured to engage a liner of the hose clamp to retain the band between the at least one flange and the crossbar until the band is tightened around the hose.

16. A locator tab for a hose clamp, the locator tab comprising:

a crossbar comprising a center beam, a first segment angled relative to the center beam, and a second segment angled relative to the center beam, a first leg extending from the first segment of the crossbar, a second leg extending from the second segment of the crossbar, a clamp end extending from one of the first and second legs, the clamp end configured to secure the locator tab to a hose, a first flange extending from the first leg, the first flange configured to retain a band of the hose clamp between the first flange and the first segment of the crossbar until the band is tightened around the hose, and a second flange extending from the second leg, the second flange configured to retain the band of the hose clamp between the second flange and the second segment of the crossbar until the band is tightened around the hose.

17. A method comprising:

positioning a band of a hose clamp between first and second legs of a locator tab, the first and second legs being positioned on opposite sides of a crossbar extending between the first and second legs of the locator tab, positioning a detent of the crossbar in a recess formed in the band of the hose clamp, and engaging the band with at least one flange included in the locator tab to retain the band of the hose clamp between the at least one flange and the crossbar, wherein the crossbar extends non-parallel to the band.

18. The method of claim 17, further comprising:

positioning the first and second legs of the locator tab against a hose, securing a clamp end extending from the second leg of the locator tab to an end of the hose, and tightening the band of the hose clamp around the hose to disengage the hose clamp from the at least one flange of the locator tab.

19. The method of claim 17, wherein engaging the band with at least one flange comprises engaging a first flange extending from the first leg of the locator tab and engaging a second flange extending from the second leg of the locator tab, such that the band is retained between (i) the first and second flanges and (ii) the crossbar.

20. The method of claim 17, wherein engaging the band with at least one flange comprises contacting a liner of the hose clamp with the at least one flange to retain the band between the at least one flange and the crossbar.

* * * * *